United States Patent [19]
Saito et al.

[11] Patent Number: 5,678,851
[45] Date of Patent: Oct. 21, 1997

[54] AIRBAG MODULE COVER

[75] Inventors: Hiroyuki Saito, Chigasaki; Mikio Ochiai, Fuji; Hiroe Inoue, Fuji; Takeshi Fujimori, Fuji; Motomu Koyama, Fuji, all of Japan

[73] Assignee: Nihon Plast Co., Ltd., Fuji, Japan

[21] Appl. No.: 636,983

[22] Filed: Apr. 24, 1996

[30] Foreign Application Priority Data

| | | | |
|---|---|---|---|
| Apr. 28, 1995 | [JP] | Japan | 7-105077 |
| May 11, 1995 | [JP] | Japan | 7-113392 |
| Jun. 21, 1995 | [JP] | Japan | 7-154999 |
| Jun. 28, 1995 | [JP] | Japan | 7-162654 |

[51] Int. Cl.$^6$ .................................................. B60R 21/16
[52] U.S. Cl. .................................. 280/728.3; 280/731
[58] Field of Search .......................... 280/728.2, 728.3, 280/731

[56] References Cited

U.S. PATENT DOCUMENTS

| | | | |
|---|---|---|---|
| 4,995,638 | 2/1991 | Shinto et al. | 280/731 |
| 5,056,814 | 10/1991 | Shiraki et al. | 280/731 |
| 5,294,147 | 3/1994 | Edge | 280/728.3 |
| 5,303,952 | 4/1994 | Shermetaro et al. | 280/731 |
| 5,344,185 | 9/1994 | Cooke, II | 280/731 |
| 5,542,694 | 8/1996 | Davis | 280/728.3 |

FOREIGN PATENT DOCUMENTS

| | | |
|---|---|---|
| 2-66353 | 5/1990 | Japan. |
| 5-139231 | 6/1993 | Japan. |
| 2 262 488 | 6/1993 | United Kingdom. |

*Primary Examiner*—Kenneth R. Rice
*Attorney, Agent, or Firm*—Foley & Lardner

[57] ABSTRACT

An airbag module cover includes a cover member and an ornament on the cover member. A plurality of pins are connected to and extend from the ornament to pass through the cover member. A retainer is engaged with the pins and cooperates with the ornament to interpose therebetween a portion of the cover member.

47 Claims, 20 Drawing Sheets

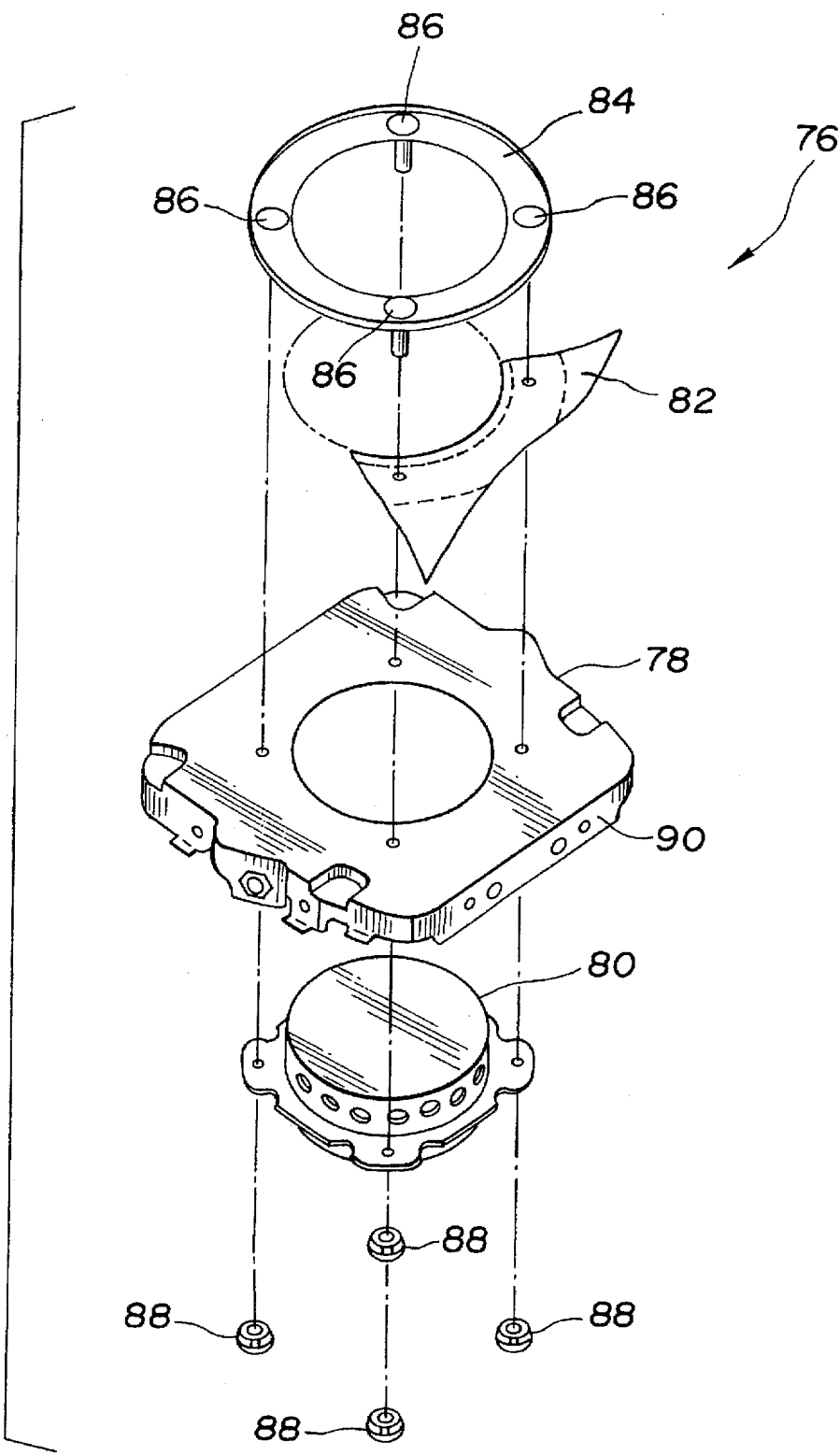

AIRBAG MODULE COVER

BACKGROUND OF THE INVENTION

The present invention relates to an airbag module cover, and more specifically to an airbag module cover including a cover member and an ornament fixed to the cover member.

Many airbag module covers including cover members with ornaments are well known. The ornaments are in the form of logo or mark representing a vehicle name or manufacturer, or the like. Among the ornaments, there are ones fixed as separate part to the cover members in order to impart a more excellent appearance to the airbag module covers than ornaments which are formed integrally with the cover members. In the case of using the ornament as separate part, the ornament must be rigidly secured to the cover member so as not to be removed from the cover member or disturb separation of the cover member which is caused along an easy-to-break line, upon inflation of a folded inflatable cushion of the airbag module.

Japanese Utility Model Application First Publication No. 2-66353 discloses an airbag module cover including a cover member made of resin, an ornament with legs, and a reinforcing net insert embedded in the cover member. The legs of the ornament have hooked portions engaged with the net insert. The ornament is secured to the cover member by the engagement of the hooked portions with the net insert.

Japanese Patent Application First Publication No. 5-139231 discloses an airbag module cover including a cover member made of urethane resin, and an ornament fixed to the cover. The ornament has a base portion embedded in the cover by insert molding, and a decorative portion exposed to an outer surface of the cover member.

However, the ornament mounting structure as disclosed in the former prior art is applicable to only an airbag module cover including a net insert embedded in a cover member. Such a limited application of the ornament formed separately from the cover member makes some inconvenience.

On the other hand, in manufacturing of the conventional airbag module cover as disclosed in the latter prior art, it is required to perform additional finishing process for imparting a good appearance to a complete airbag module cover, as explained hereinafter.

Generally, upon insert molding by using polyurethane resin, coating agent or mold release agent is applied to a cavity side of a mold before molding. The coating agent or mold release agent is left on an outer surface of the ornament when taking out of the mold after molding, and then the agent must be removed in the finishing process. In addition, upon insert molding, the ornament must be positioned in contact with the cavity without any clearance therebetween. If there is undesirably a clearance between the outer surface of the ornament and the cavity side, the polyurethane resin flows into the clearance to form a coating layer over the outer surface of the ornament. The coating layer spoils an appearance of the ornament, and therefore it must be removed from the outer surface of the ornament in the subsequent finishing process.

In the case of using thermoplastic resin upon insert molding, flash is produced at a periphery of the ornament contacted with the cover member. The flash must be also removed in the subsequent finishing process.

An object of the present invention is to provide an airbag module cover capable of being readily manufactured and having a rigid ornament-mounting structure in which an ornament is prevented from being removed from a cover member upon inflation of a folded inflatable cushion of an airbag module.

SUMMARY OF THE INVENTION

According to one aspect of the present invention, there is provided an airbag module cover, comprising:

a cover member;

an ornament on the cover member;

a fastener connected to and extending from the ornament to pass through the cover member; and a retainer in engagement with the fastener and cooperating with the ornament to interpose therebetween a portion of the cover member.

BRIEF DESCRIPTION OF THE DRAWINGS

FIG. 7 is an exploded view of the airbag module;

DESCRIPTION OF THE PREFERRED EMBODIMENT

Figure 1:
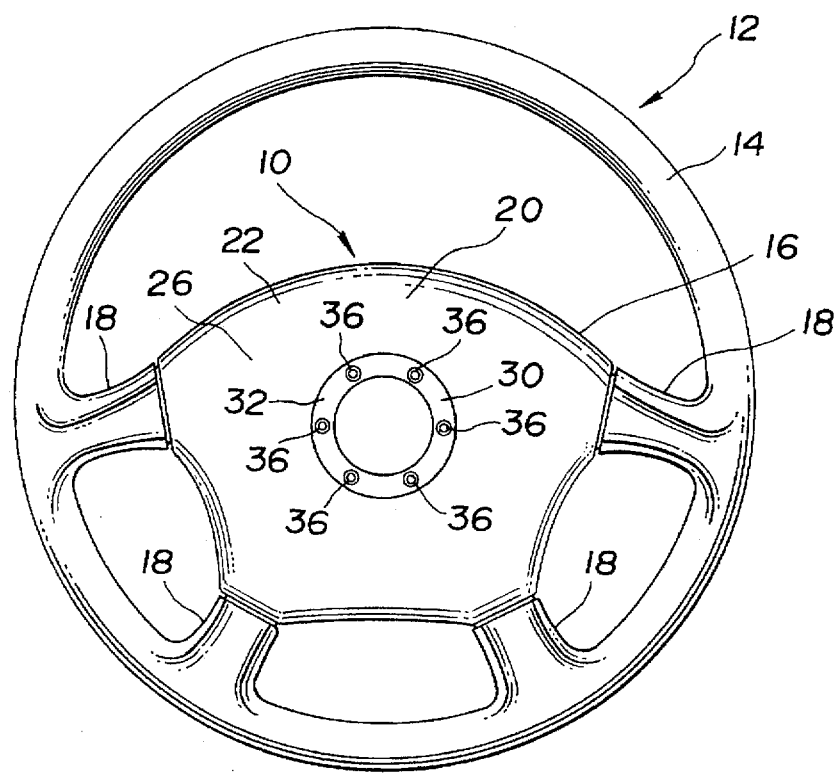
FIG. 1 is a schematic top plan view of a vehicle steering wheel on which an airbag module cover according to the present invention is installed.

Referring now to FIG. 1, an airbag module cover 10 of one embodiment according to the present invention now will be explained. The airbag module cover 10 is mounted to an airbag module as explained later, which is installed to a vehicle steering wheel 12.

As illustrated in FIG. 1, the steering wheel 12 includes an annular rim portion 14, a boss portion 16 disposed inside the rim portion 14, and a plurality of spoke portions 18 connecting the rim portion 14 and the boss portion 16. The rim portion 14 and the spoke portions 18 are generally covered with an outer layer made of a relatively soft synthetic resin. Disposed on the boss portion 16 are the airbag module and the airbag module cover 10 mounted to the airbag module.

Figure 2:
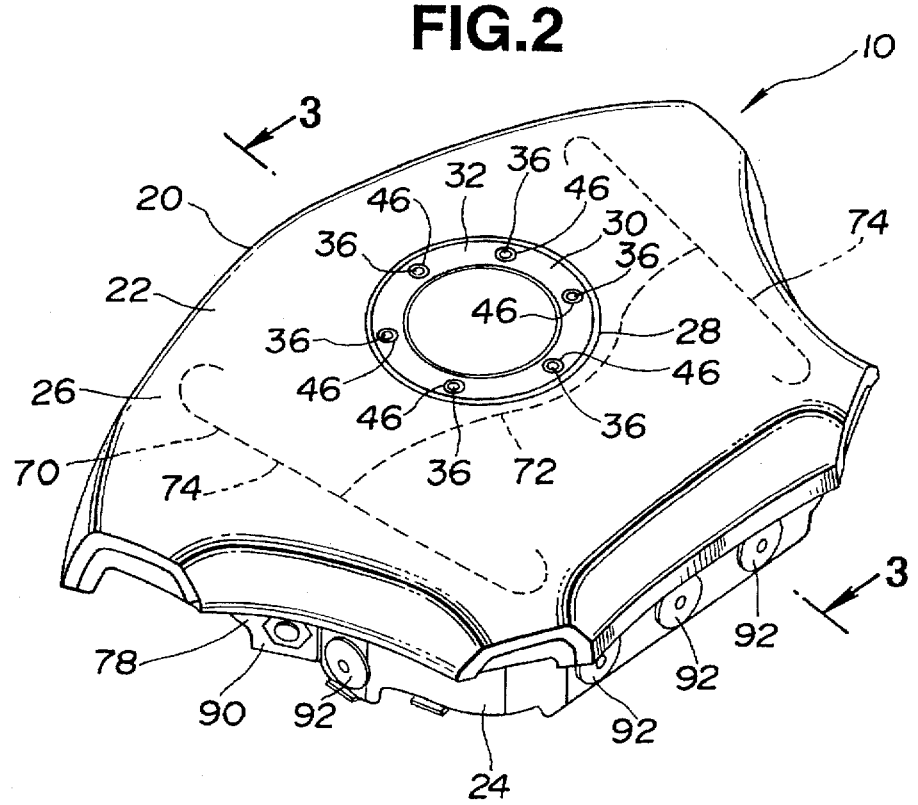
FIG. 2 is a perspective view of the airbag module cover secured to an airbag module.

As seen from FIGS. 1 and 2, the airbag module cover 10 includes a cover member 20 having a generally rectangular box shape. The cover member 20 is made of resilient synthetic resin such as thermoplastic elastomer and manufactured by injection molding. The cover member includes a generally rectangular upper wall 22, and a side wall 24 extending downward as viewed in FIG. 2, from the upper wall 22 to form a cylindrical shape having a generally rectangle in section. The upper wall 22 and the side wall 24 are formed integrally with the cover 20. The upper wall 22 covers the boss portion 16 and a part of each of the spoke portions 18.

Figure 3:
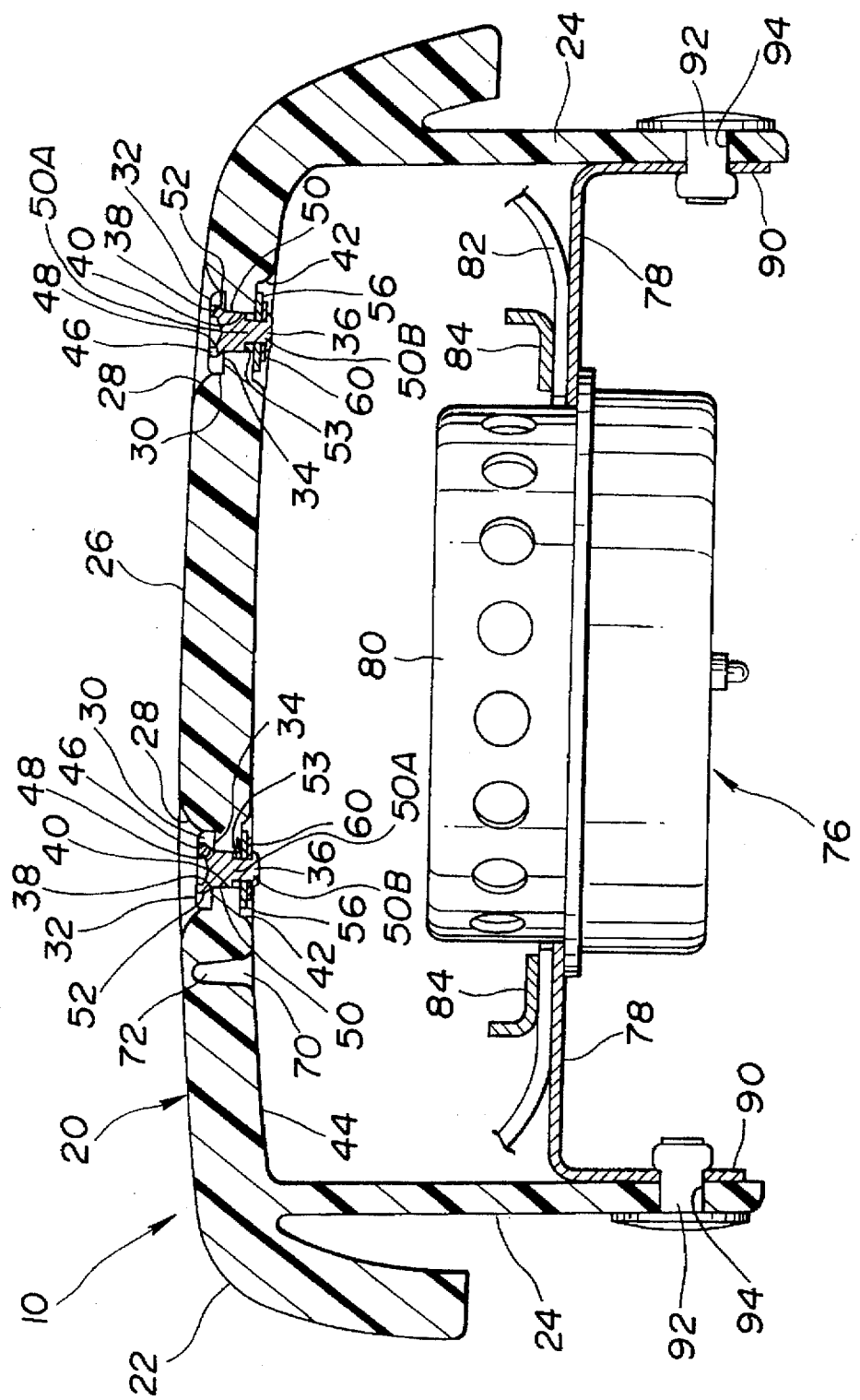
FIG. 3 is a section taken along line 3—3 of FIG. 2.
Figure 4:
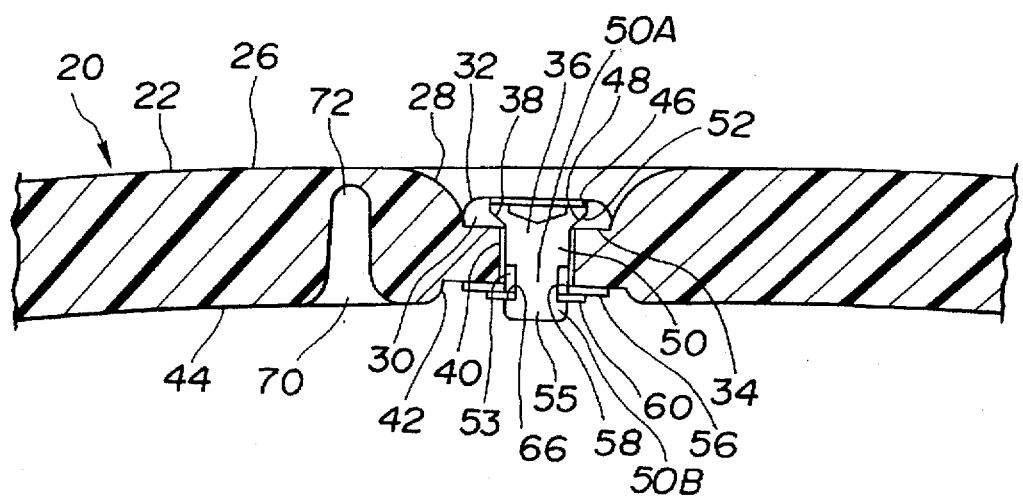
FIG. 4 is a partly enlarged view of FIG. 3.

As illustrated in FIGS. 3 and 4, the upper wall 22 of the cover member 20 has an outer surface 26 formed with an outer recessed portion 28 of an annular shape. The annular outer recessed portion 28 has inner and outer circumferential rounded edges.

An ornament 30 is disposed within the outer recessed portion 28 of the outer surface 26 of the upper wall 22 of the cover member 20. The ornament 30 is in the form of an annular plate made of aluminum alloy. The ornament may be of various outer contours corresponding to that of the annular outer recessed portion 28 of the cover member 20, including circular or ellipsoidal disk, polygon such as triangle, tetragon, pentagon, hexagon, and the like, with round corners, and a configuration defined by an irregular curve. The ornament may be made of metal such as titanium alloy, stainless steel, resin materials such as polycarbonate, various nylons, ABS (acrylonitrile-butadiene-styrene) resin, various elastomeric resins, various modified elastomeric resins, unsaturated polyester resin, sliced wood chip with aluminium-alloy backing plate or the like. Further, the ornament may be made of afore-mentioned resin materials with coating film, afore-mentioned resin materials with printing of grain, marble, or the like, afore-mentioned resin materials with metal foil such as gold leaf, metal coating. The ornament 30 has an ornamental upper surface 32 formed with a great number of lines as hairline and a lower surface 34 contacted with the outer recessed portion 28 of the upper wall 22 of the cover member 20.

A fastener is connected to the ornament 30 and extend from the ornament 30 to pass through the upper wall 22 of the cover member 20. In this embodiment, the fastener is in the form of a plurality of pins 36 are connected to the ornament 30 and extend from the ornament 30 to pass through the upper wall 22 of the cover member 20.

Specifically, the plurality of pins 36 are inserted into a plurality of holes 38 disposed along a circumferential edge of the ornament 30 in equidistantly spaced relation to each other. The upper wall 22 of the cover member 20 is formed at the outer recessed portion 28 with a plurality of mount holes 40 in alignment with the holes 38 of the ornament 30. The mount holes 40 extend from the outer recessed portion 28 to an annular-shaped inner recessed portion 42 which is disposed on an inner surface 44 of the upper wall 22 in opposed relation to the outer recessed portion 28. The inner recessed portion 42 has inner and outer circumferential rounded edges. The pins 36 are inserted into the mount holes 40 to project from the inner recessed portion 42 of the upper wall 22.

As best shown in FIG. 4, each of the holes of the ornament 30 includes a larger hole portion 46 open to the upper surface 32 of the ornament 30 and a smaller hole portion 48 open to the lower surface 34 of the ornament 30. The smaller hole portion 48 has a section tapered toward the lower surface 34 with gradually decreasing in diameter. The smaller hole portion 48 is at its distal end substantially equal in diameter to each of the mount holes 40 of the upper wall 22 of the cover member 20.

The plurality of pins 36 are made of metal, for example, steel. Each of the plurality of pins 36 includes an axially extending shaft portion 50 and a head portion 52 which is connected to the shaft portion 50 and greater in diameter than the shaft portion 50. The shaft portion 50 is engaged with the smaller hole portion 48 of the hole 38 of the ornament 30, and the head portion 52 is engaged with the larger hole portion 46 of the hole 38. The shaft portion 50 is formed on its peripheral surface with a radial groove 53 extending along a given axial length of the pin 36. Thus, the shaft portion 50 of the pin 36 has a smaller-diameter portion 50A axially extending along the groove 53, and a greater-diameter portion 50B axially extending from a leading edge 66 of the groove 53 to the distal end 55. The pin 36 is constructed such that the head portion 52 has an end face substantially flush with the upper surface 32 of the ornament 30 or positioned in the larger hole portion 46 of the hole 38 so as to be retracted slightly from the upper surface 32 of the ornament 30. The shaft portion 50 extends through the mount hole 40 of the upper wall 22 of the cover member 20 and projects therefrom to the inside of the cover member 20. As shown in FIG. 4, the pin 36 has a distal end 55 which projects from the inner 25 recessed portion 42 of the upper wall 22 of the cover member 20 and is exposed to the inside of the cover member 20.

A retainer 56 is disposed within the inner recessed portion 42 of the upper wall 22 of the cover member 20. The retainer 56 is in engagement with the plurality of pins 36 projecting from the inner recessed portion 42, and cooperates with the ornament interpose therebetween a portion of the cover member 20. The retainer 56 is held in such a manner as to compress the portion of the cover member 20 between the ornament 30 and the retainer 56, as explained in detail hereinafter.

Specifically, the retainer 56 is in the form of a generally annular plate provided, for instance, by stamping a sheet material made of thermoplastic resin such as polycarbonate resin. The retainer 56 may be provided by injection molding or compression molding. The retainer 56 is formed with a plurality of holes 58 in alignment with the mount holes 40 of the upper wall 22 of the cover member 20. Each of the pins 36 extends through each of the holes 58 to project therefrom.

Figure 5:
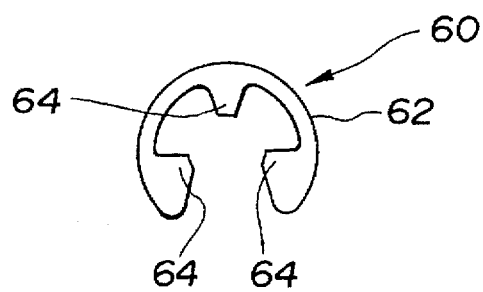
FIG. 5 is a plan view of a retaining ring.

A retaining ring 60 is mounted to each of the pins 36 and contacted with the retainer 56. The retaining ring 60 is made of an elastic material and has a generally E shape including an arcuate body portion 62 and three pawls 64 extending radially inwardly from opposing ends of the arcuate body portion 62 and a mid-portion between the opposing ends thereof, as shown in FIG. 5. The pawls 64 are engaged with the groove 53 of each of the pins 36 to thereby prevent the retainer 56 from being disengaged from the pins 36. The pawls 64 abut against the leading edge 66 of the groove 53 which limits a movement of the retaining ring 58 along an axis of the pin 36. The retainer 56 is held so as to compress the portion of the upper wall 22 of the cover member 20 between the ornament 30 and the retainer 56.

Upon assembly, the plurality of pins 36 are inserted into the holes 38 of the ornament 30. The ornament 30 with the pins 36 is placed on the outer recessed portion 28 of the upper wall 22 of the cover member 20 such that the pins 36 are inserted into the mount holes 40 of the upper wall 22. The retainer 56 is placed on the inner recessed portion 42 of the inner surface 44 of the upper wall 22 such that the distal end 55 of each of the pins 56 projects from each of the holes 58 of the retainer 56 to the inside of the cover member 20. The retainer 56 cooperates with the ornament 30 to interpose the portion of the upper wall 22 of the cover member 20 therebetween. Then, the ornament 30 with the pins 36 is urged to move toward the retainer 56 while the retainer 56 is urged to move toward the ornament 30 such that the grooves 53 of the pins 36 are exposed from the holes 58 of the retainer 56. The retaining rings 60 are mounted to the pins 36 such that the pawls 84 are engaged in the groove 58 of each of the pin 36. Thus, the retainer 56 is held so as to compress the portion of the upper wall 22 of the cover member 20 between the ornament 30 and the retainer 56. When the ornament 30 and the retainer 56 are free from the compression force, the portion of the upper wall 22 of the cover member 20 is restored against the compression force because of its resiliency, to enhance pressure contact of the interposed portion of the upper wall 22 of the cover member 20 with the ornament 30 and the retainer 56. This serves for preventing a movement of the ornament 30 relative to the interposed portion of the upper wall 22 of the cover member 20, allowing a rigid securement of the ornament 30 to the cover member 20. The interposed portion of the cover member 20 may be formed as a separate part having a resilient restorative characteristic. Further, this arrangement serves for reducing the ornament 30 in thickness extending along the pin 56 and reducing the pin 36 in axial length, resulting in providing an increased interior space of the airbag cover 10 for accommodating a folded inflatable cushion of the airbag module.

The aforementioned arrangement serves for assuring the securement of the ornament 30 to the cover member 20 such that the ornament 30 is prevented from falling off or being removed from the cover member 20 upon inflation of the folded inflatable cushion of the airbag module.

The cover member 20 has an easy-to-break line 70 on the inner surface 44 of the upper wall 22 as shown in FIG. 4. The easy-to-break line 70 is in the form of groove or perforation and of a generally H shape shown in FIG. 2, including a center portion 72 laterally extending between opposed sides of the upper wall 22, and two traversing portions 74 extending substantially perpendicularly from opposite ends of the center portion 72. The easy-to-break line 70 defines a pair of flap portions integrally hinged to the upper wall 22 of the cover member 20 and forcibly separable therefrom when the folded inflatable cushion of the airbag module inflates. The center portion 72 curves along the outer recessed portion 28 to bypass the outer recessed portion 28 in spaced relation thereto at a predetermined distance. The center portion 72 of the easy-to-break line 70 is not limited to the curved shape shown in FIG. 2 but may be of various configurations including a straight line, a shape of a character "V" or "U" and the like, which are so arranged as to bypass the outer recessed portion 28. This arrangement prevents the ornament 30 secured to the cover member 20 from disturbing separation of the flap portions of the upper wall 22 from the cover member 20 upon inflation of the folded inflatable cushion, serving For smooth and full deployment off the cushion.

Since, in this embodiment, the ornament 30 made of metal is provided as a separate part to be secured to the cover member 20, tile airbag module cover 10 of the invention is more excellent in aesthetic than a conventional airbag module cover including an ornament which is formed integrally with a cover member. The arrangement of the pins 36 provided along the circumferential edge of the ornament 30 in equidistantly spaced relation to each other, improves an appearance of the airbag module cover 10.

Furthermore, since insert molding process is not used to manufacture the airbag module cover 10 of the invention, the ornament 30 can be free from being stained with coating agent or mold release agent applied to the mold, or flash produced at a periphery of the ornament contacted with the cover member. Therefore, additional process is not required for removing the coating agent or mold release agent or the flash from the ornament, which results in increasing operating efficiency in the manufacturing of the airbag module cover and improving an appearance of the airbag module cover.

Figure 6:
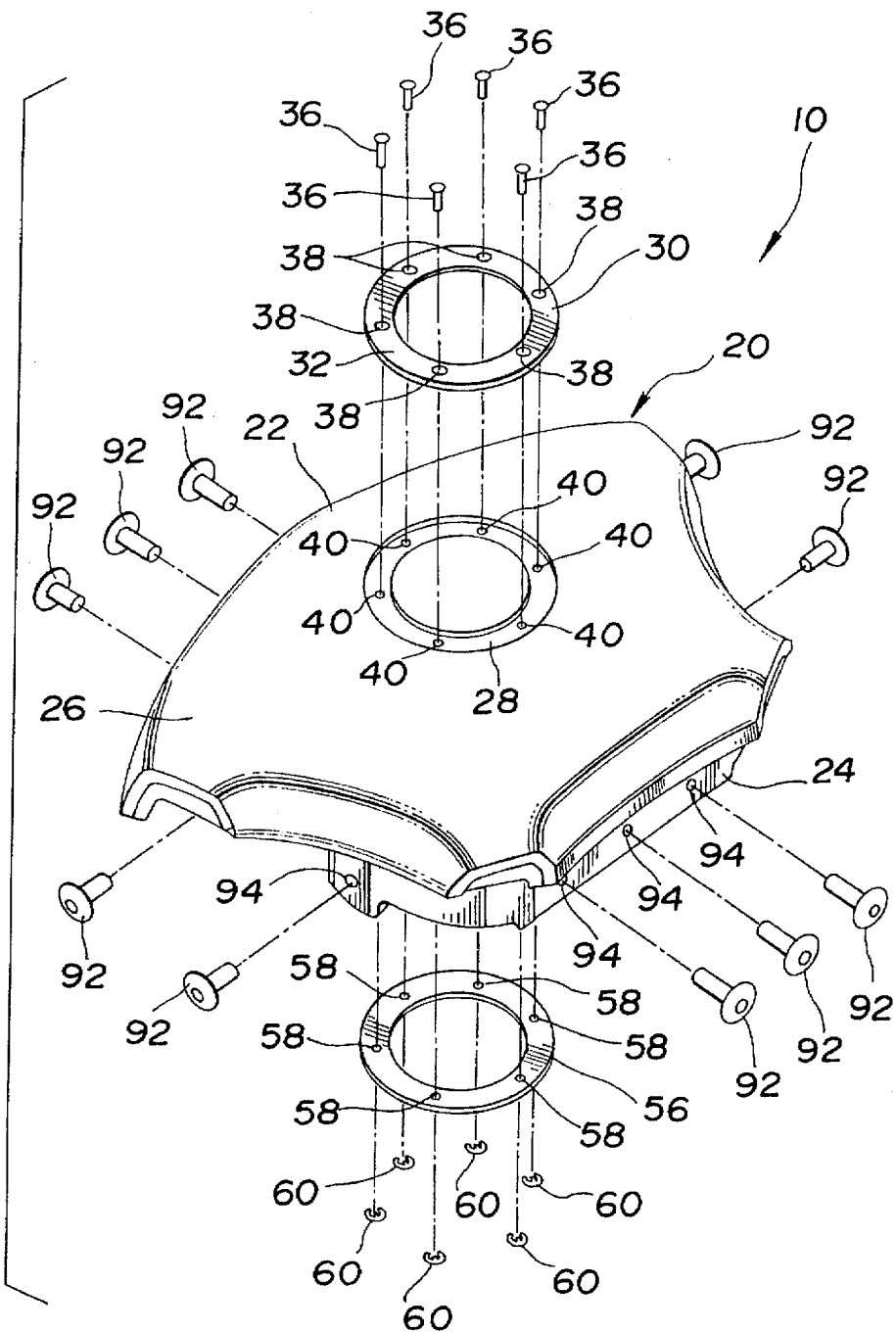
FIG. 6 is an exploded view of tile airbag module cover.

The airbag module cover 10 shown in FIG. 6 is mounted to the airbag module 76 shown in FIG. 7. As illustrated in FIG. 7, the airbag module 76 includes a metal base plate 78. A gas generator 80 and the folded inflatable cushion 82 are secured to the base plate 78 through a cushion retainer 84 by means of fastening members such as bolts 86 and nuts 88. The cover 10 is secured to the base plate 78. Specifically, the side wall 24 of the cover member 20 is fixed to a downward extending flange portion 90 of the base plate 78 by means of rivets 92 shown in FIG. 6. Reference numeral 94 denotes holes 94 provided in the side wall 24 for receiving the rivets 92. Thus, the side wall 24 of the cover member 20 acts as a mounting portion at which the cover 10 is mounted to the airbag module 76.

Figure 8:
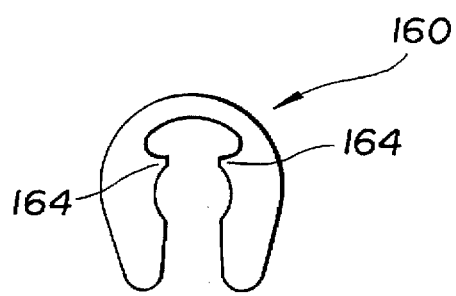
FIGS. 8–13 are plan views of modified retaining rings.
Figure 9:
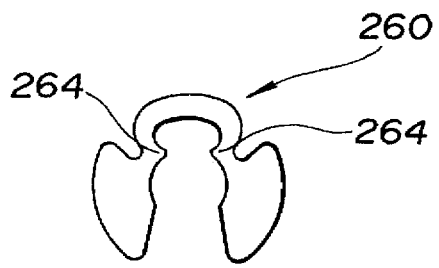
Figure 10:
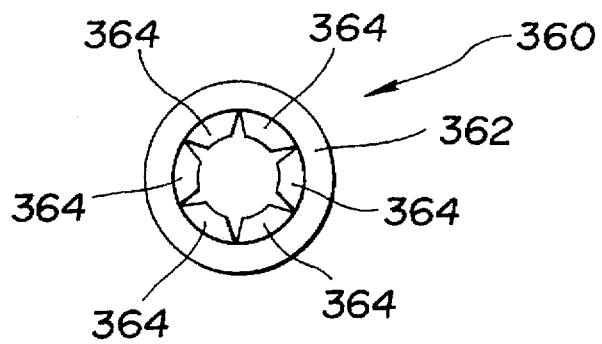
Figure 11:
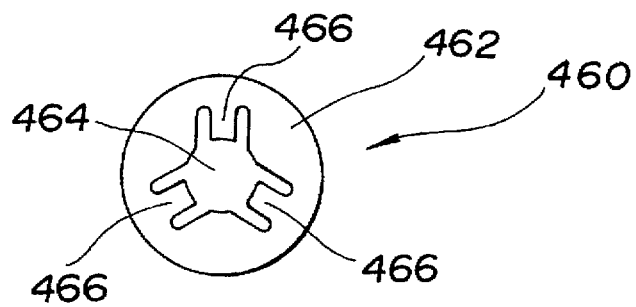
Figure 12:
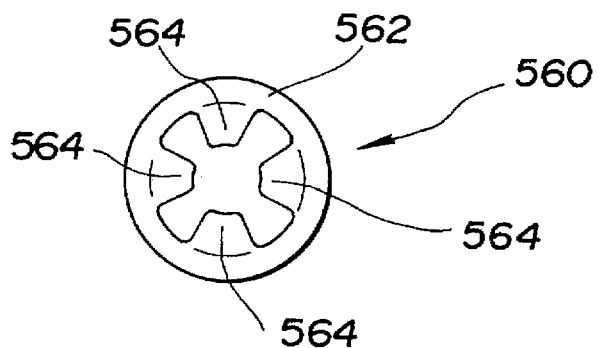
Figure 13:
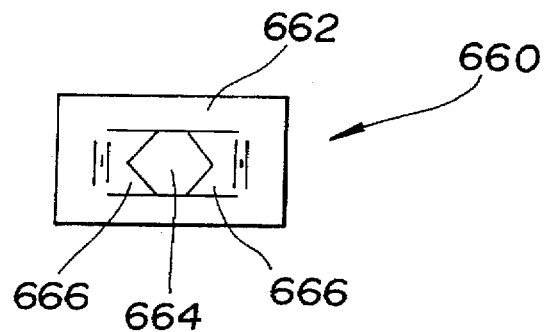
Figure 18:
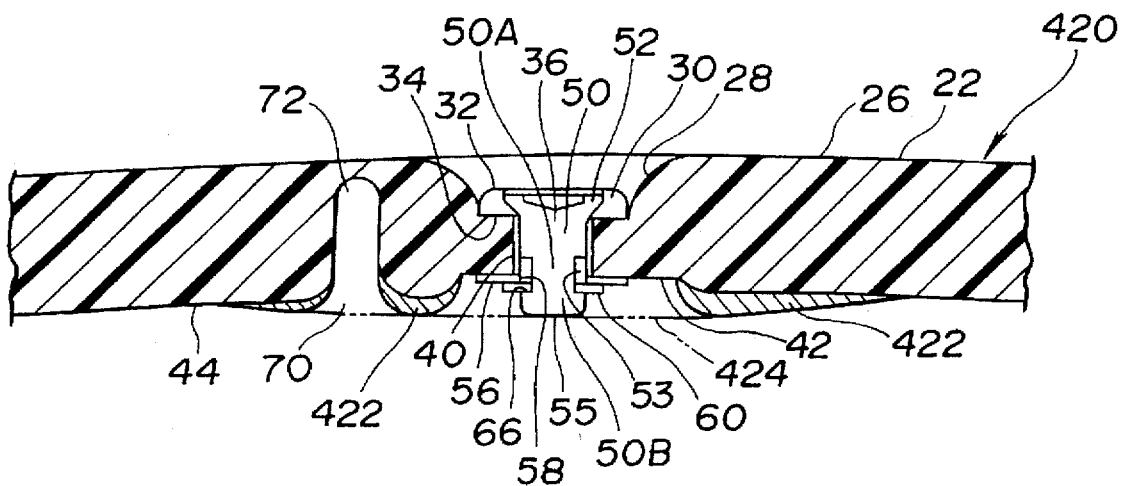
FIGS. 18 and 19 are sections similar to FIG. 4, but showing modified cover members, respectively.

FIGS. 8–13 illustrate modified retaining rings. FIGS. 8 and 9 respectively showy a generally U-shaped retaining ring 160 with pawls 164 and a generally K-shaped retaining ring 260 with pawls 264. FIG. 10 shows a toothed retaining ring 360 having an annular body 362 with resiliently deformable teeth 364 extending radially inwardly from the annular body 862. FIG. 11 shows a flat disk-like retaining ring 460 having a generally disk-shaped body 462 formed with an opening 464 and projections 466 partly defining the opening 464. FIG. 12 illustrates a modified annular retaining ring 560 having an annular body 562 with radial in,yard projections 564. FIG. 18 illustrates a rectangular retaining ring 660 having a generally rectangular body 662 with a hexagonal opening 664 and a pair of opposed projections 666 partly defining the hexagonal opening 664. Each of the pins 36 may be formed with various types of grooves which are configured so as to engage pawls, teeth, projections, or the like of these retaining rings 160–660.

Figure 14:
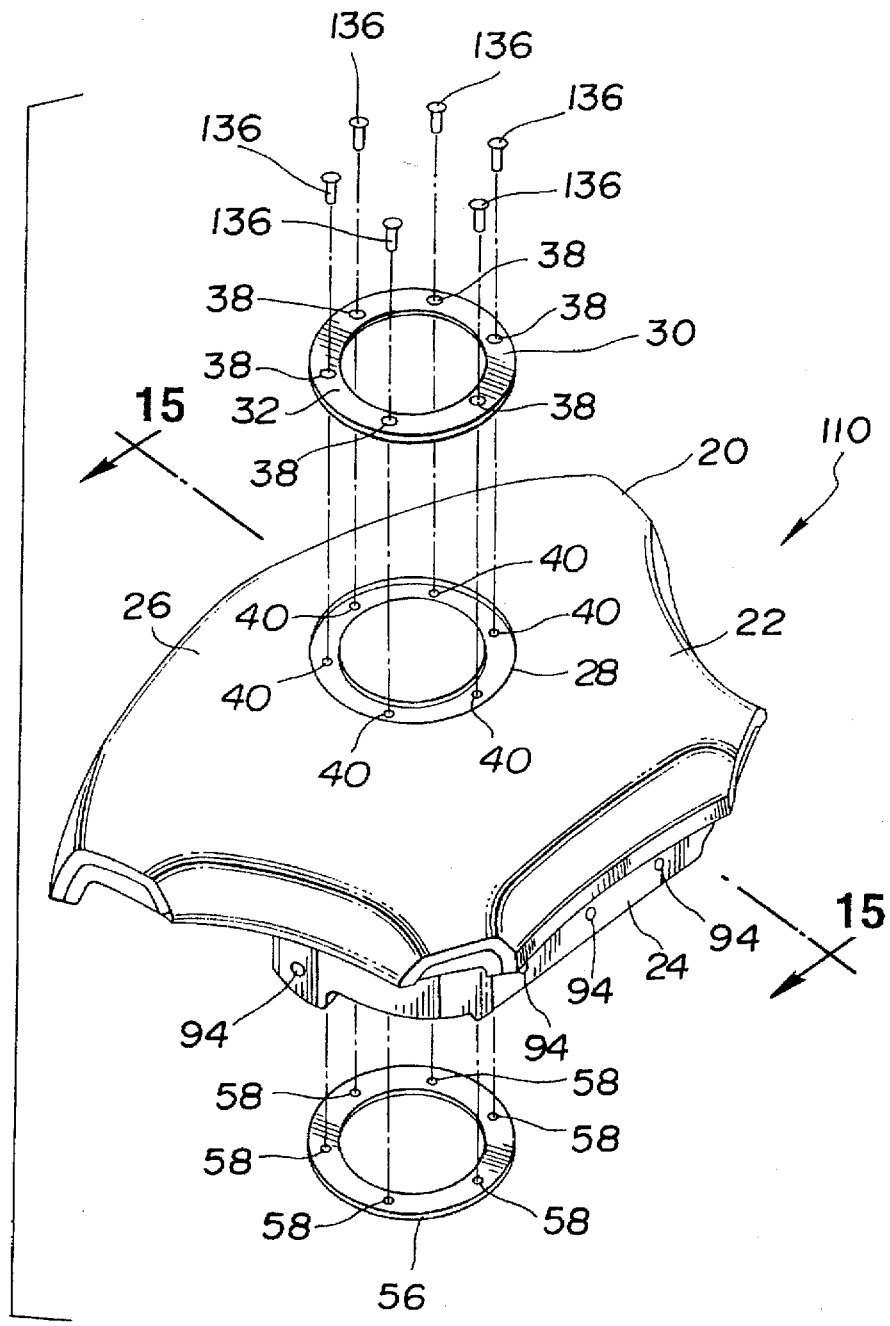
FIG. 14 is an exploded view of a second embodiment of the airbag module cover.
Figure 15:
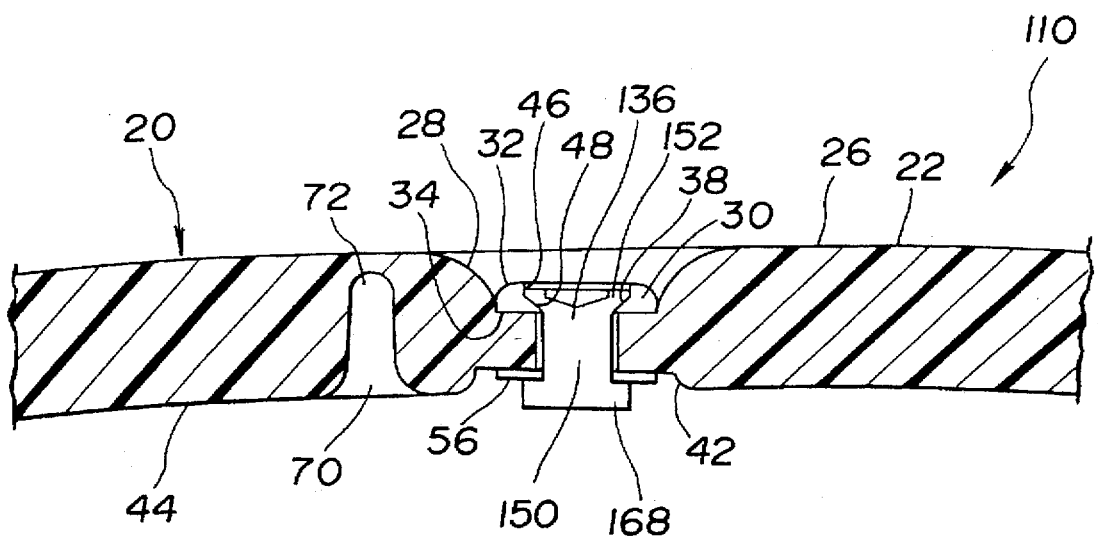
FIG. 15 is a fragmentary enlarged section taken along line 15—15 of FIG. 14.

Referring to FIG. 14, the airbag module cover 110 of a second embodiment according to the invention, is now explained. The airbag module cover 110 is similar to the airbag module cover 10 of the first embodiment except using a plurality of rivets 1136 and dispensing with the retaining rings 60 of time first embodiment. Like reference numerals denote like parts and therefore detailed explanations therefor are omitted. As seen from FIG. 14, the rivets 136 acting as fastener are inserted into the holes 38 of the ornament 30, the mount holes 40 of the upper wall 22 of the cover 20, and the holes $8 of the retainer 56. Each of the rivets 136 bas a shaft portion 150 and a head portion 152 greater in diameter than the shaft portion 150, as well as each of the pins 36 of the first embodiment. The rivet 136 is staked at a distal end thereof projecting from the bole 58 of the retainer 56 to thereby be formed with a flange 168 which extends radially outwardly from the shaft portion 150 as shown in FIG. 15. The flange 168 of the rivet 136 engages the retainer 56 to hold the retainer 56 in such a manner as to compress the portion of the cover member 20 between the ornament 30 and the retainer 56. Thus, the flange 168 of the rivet 136 acts as the retaining ring 60 of the first embodiment. In the second embodiment, the ornament 30 can be rigidly secured to the upper wall 22 of the cover member 20 without using the retaining rings 60 of the first embodiment. This results in reducing the number of parts of the airbag module cover.

Figure 16:
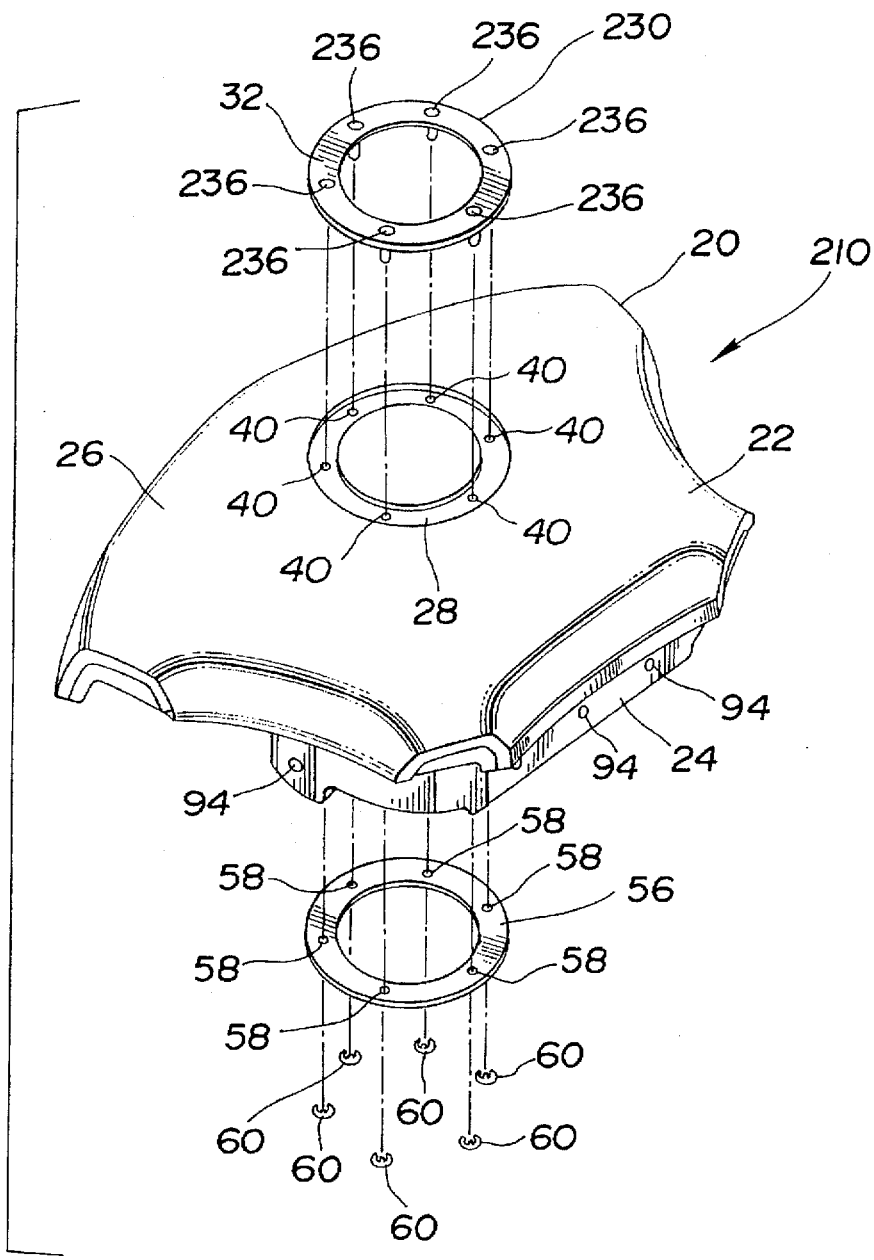
FIG. 16 is an exploded view of a third embodiment of the airbag module cover.

Referring to FIG. 16, an airbag module cover 210 of a third embodiment according to the invention, is now explained. The airbag module cover 210 is similar to the airbag module cover 10 of the first embodiment except a plurality of legs 236 provided on the ornament 230. Like reference numerals denote like parts and therefore detailed explanations therefor are omitted. As shown in FIG. 16, the legs 236 are formed integrally with the ornament 230. The legs 236 are so constructed as to engage the retaining rings 60, acting as fastener. This engagement causes the retainer 56 to be held in such a manner as to compress the portion of the cover member 20 between the ornament 230 and the retainer 56. The third embodiment serves for reducing the number of parts and improving an efficiency of assembling operation.

Figure 17:
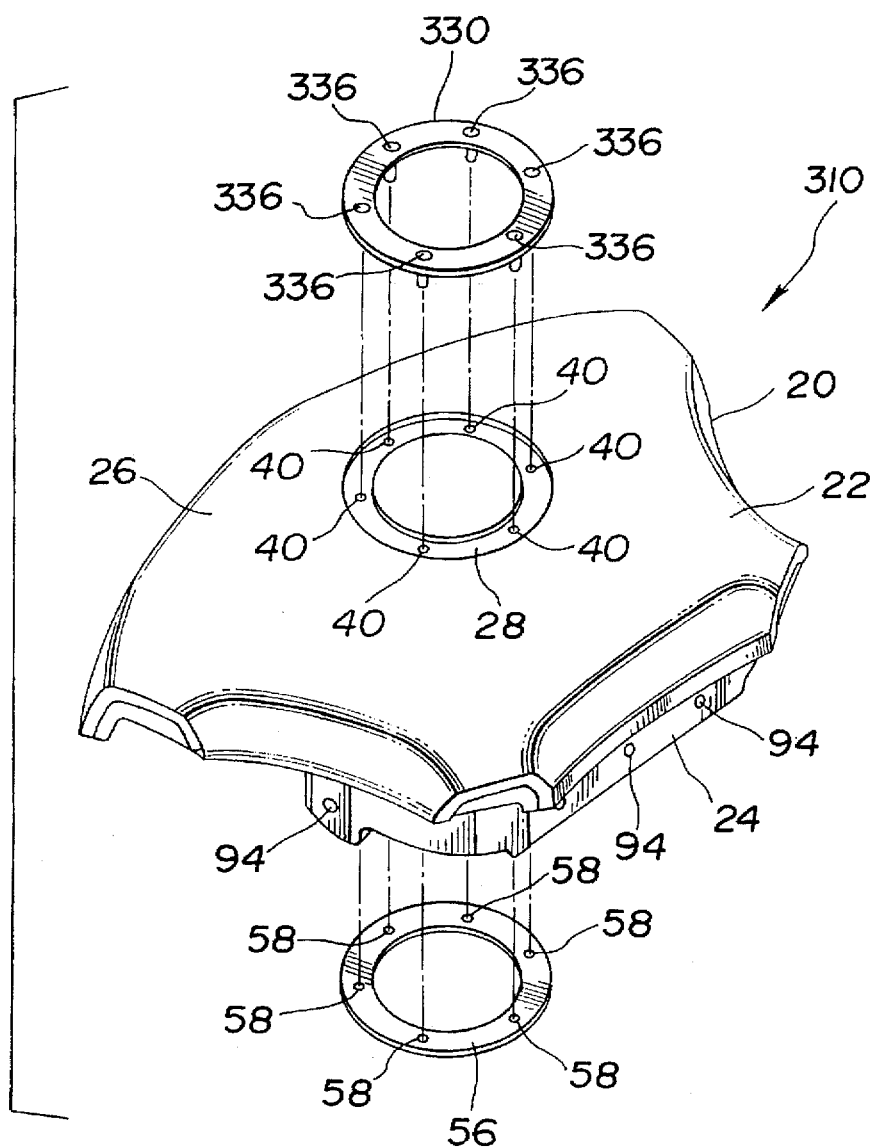
FIG. 17 is an exploded view of a fourth embodiment of the airbag module cover.

Referring to FIG. 17, there is shown an airbag module cover 310 of a fourth embodiment of the invention, which is similar to the first embodiment except providing projections 336 formed integrally with tile ornament 330, and dispensing with the retaining rings 60 of the first embodiment. Like reference numerals denote like parts. The projections 336 are made of metal and staked at their distal end to form flanges, as described concerning the rivets 136 of the second embodiment. In a case where the ornament 330 and the projections 336 are made of a thermoplastic resin material, the projections 336 can be thermally staked at distal ends thereof by various heating methods by using ultrasonic vibration or a heating plate. The thermally staked distal ends of the projections 336 acts as the retaining rings 60 of the first embodiment.

The legs 236 of the third embodiment and the projections 336 of the fourth embodiment may be manufactured as separate parts and then fixed to the ornaments 230 and 330 in a suitable manner to form an united ornament body.

Figure 19:
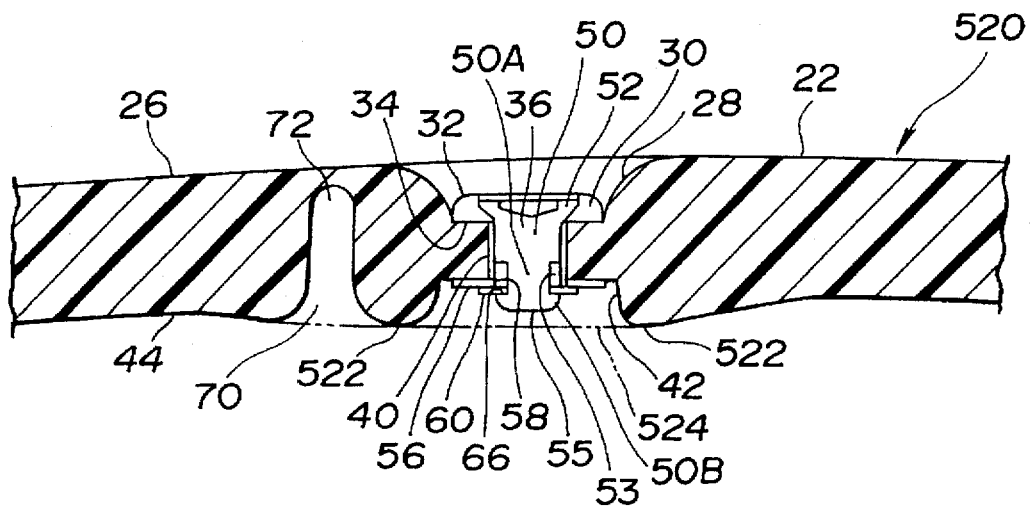
Figure 20:
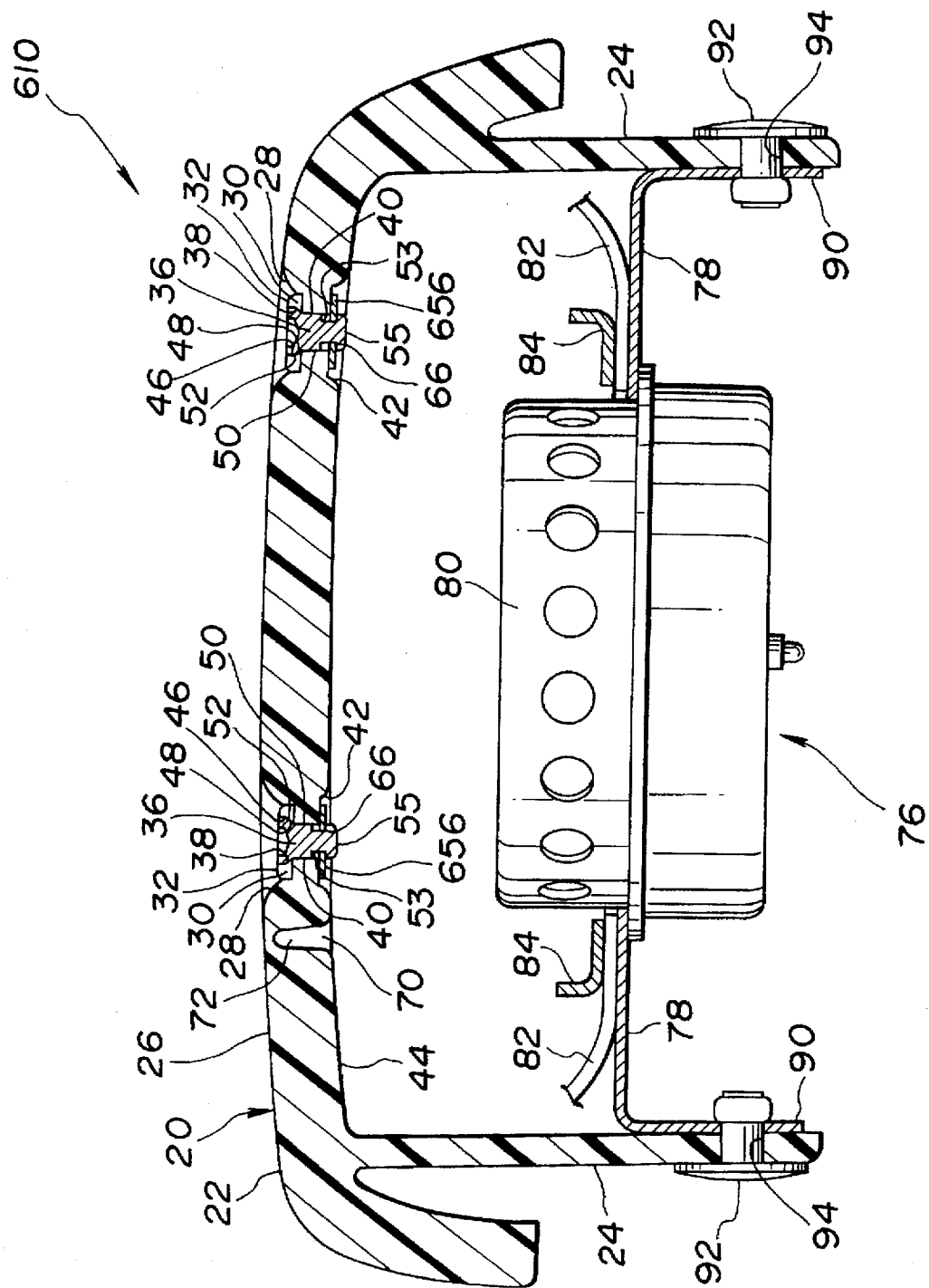
FIG. 20 is a section of a fifth embodiment of the airbag module cover secured to an airbag module.
Figure 21:
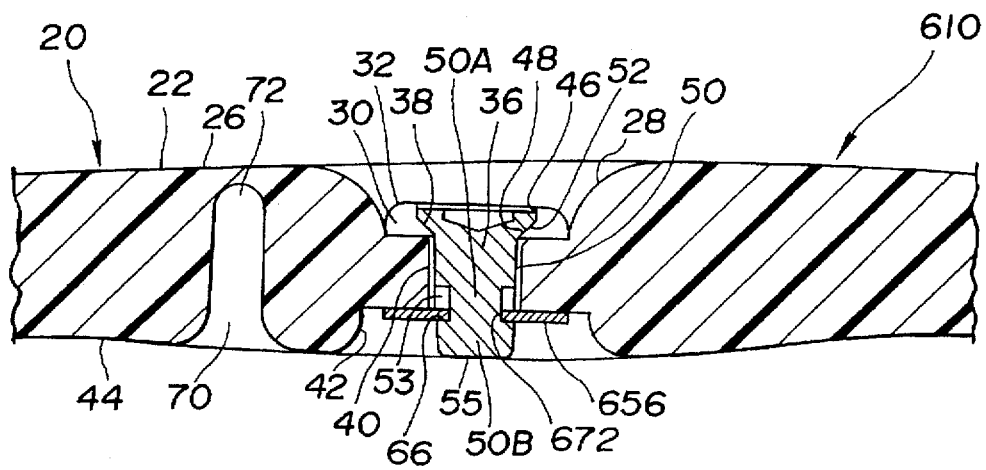
FIG. 21 is a partly enlarged view of FIG. 20.

Referring to FIGS. 18 and 19, modified cover members 420 and 520 now will be explained, which are similar to the cover member 20 of the first embodiment except respective swelled portions 422 and 522. Like reference numerals denote like parts and therefore detailed descriptions therefor are omitted.

As illustrated in FIG. 18, the modified cover member 420 includes the swelled portion 422 connected with the inner recessed portion 42 of the upper wall 22. The swelled portion 422 is disposed adjacent to and along the inner and outer circumferential edges of the inner recessed portion 42 and slightly projects therefrom inwardly or downwardly as viewed in FIG. 18. The swelled portion 422 defines an imaginary surface 424 as indicated in broken line in FIG. 18, which is substantially flush with the distal end 55 of each of the pins 36 and merges into the inner surface 44 of the upper wall 22. The swelled portion 422 may be formed integrally with the cover member 420. The swelled portion 422 and the distal end 55 of the pin 36 are in smooth and slidable contact with the folded inflatable cushion 82 of the airbag module 76 when the folded inflatable cushion 82 deploys. Thus, the arrangement of the swelled portion 422 in substantially flush with the distal end 55 of the pin 36 serves for permitting sharing load exerted on the cushion 82 upon inflation of the cushion 82. This contributes to a ready deployment of the cushion 82.

As illustrated in FIG. 19, the modified cover member 520 includes the swelled portion 522 formed integrally with the upper wall 22. The swelled portion 522 is disposed adjacent to and along the inner and outer circumferential edges of the inner recessed portion 42 and slightly projects therefrom inwardly or downwardly as viewed in FIG. 19. The swelled portion 522 defines an imaginary surface 524 as indicated in broken line in FIG. 19, from which the distal end 55 of the pin 36 is retracted to thereby be disposed within the inner recessed portion 42. When the folded inflatable cushion 82 of the airbag module 76 deploys, the distal end 55 of the pin 36 is prevented from slidably contacting the folded inflatable cushion 82 while the swelled portion 522 slidably contacts the cushion 82. Similar to the modified cover member 420 of FIG. 18, the modified cover member 520 serves for permitting sharing load exerted on the cushion 82 upon inflation of the cushion 82. This allows the cushion 82 to deploy smoothly.

Referring to FIGS. 20–23, an airbag module cover 610 of a fifth embodiment of the invention is now explained. The airbag module cover 610 is similar to the airbag module cover 10 of the first embodiment except a retainer 656 formed with a plurality off openings 658 for holding the retainer 656 without using the retaining rings as explained in the first embodiment. Like reference numerals denote like parts and therefore detailed explanations therefor are omitted.

Figure 22:
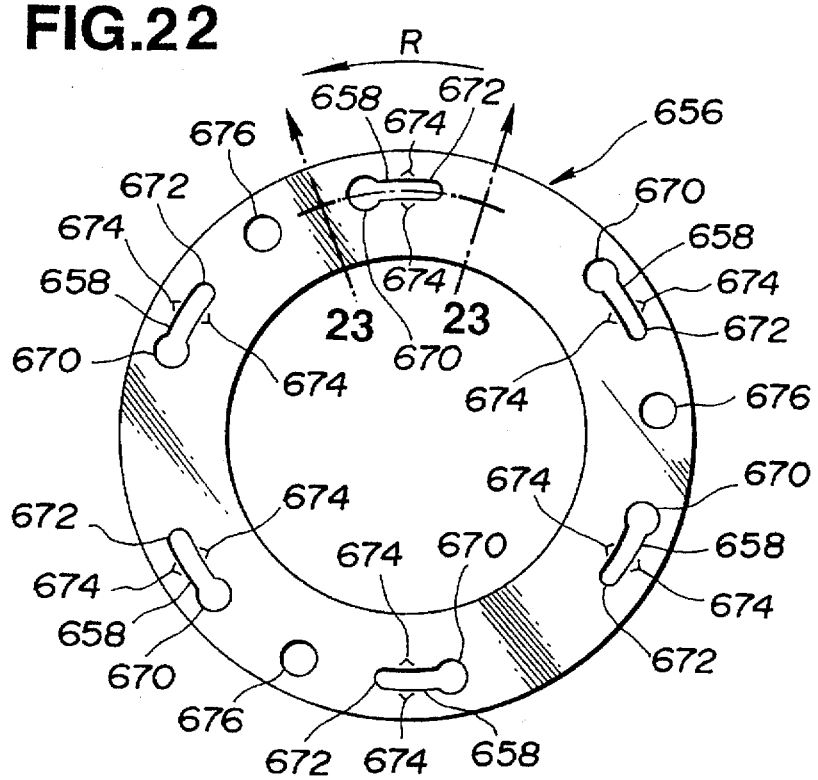
FIG. 22 is an enlarged plan view of a retainer shown in FIG. 20.
Figure 23:
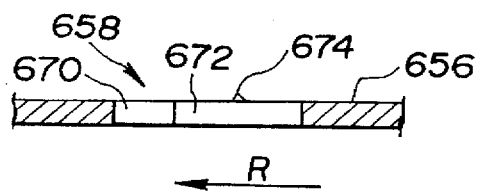
FIG. 23 is a fragmentary enlarged section taken along line 23—23 of FIG. 22.

The retainer 656 is of an annular shape an illustrated in FIG. 22, and formed by stamping a plate made of metal such as steel. The plurality of openings 658 are provided corresponding to the pins 36 engageable therewith. The plurality of openings 658 are disposed along a circumferential edge of the retainer 656 and spaced apart from each other at a predetermined distance. In this embodiment, six openings 658 are disposed corresponding to the six pins 36 engageable therewith. Each of the openings 658 includes a circular hole 670 and an arcuate guide groove 672 connected to the hole 670. The hole 670 is so configured as to allow insertion of the greater-diameter portion 506 and smaller-diameter portion 50A of the shaft portion 50 of the pin 36. The guide groove 672 is so configured as to allow insertion of the smaller-diameter portion 50A of the shaft portion 50 of the pin 36 but prevent insertion of the greater-diameter portion 506 thereof. A pair of detents 674 are disposed near elongate edges of the guide groove 672 in opposed relation. The detents 674 are in the form of a projection provided by pressing and extend toward a radial face of the greater-diameter portion 50B, viz, the leading edge 66 of the groove 53. Disposed between the adjacent two openings 658 in a tool insertion hole into which a part of a tool (not shown) is inserted to rotate the retainer 656 as explained later. Upon mounting, the retainer 656 is placed on the inner recessed portion 42 of the upper wall 22 of the cover member 20 such that the greater-diameter portion 50B of each pin 36 projecting from the mount hole 40 is inserted into the hole 670 of each opening 658. The retainer is pressed against the inner recessed portion 42 of the upper wall 22 and then rotated in a direction R by using the tool inserted into the tool insertion holes 676. The smaller-diameter portion 50A of the pin 36 moves from the hole 670 to the guide groove 672 such that the greater-diameter portion 50B is engaged with the guide groove 672. By this engagement, the pin 36 is prevented from axially moving and passing through the guide groove 672 of the opening 658. When the greater-diameter portion 50B is placed in the guide groove 672, the detents 674 abut against the greater-diameter portion 50B to prevent the retainer 656 from rotating in a direction opposite to the direction R. Thus, the retainer 656 is held so as to compress the portion of the cover member 20 between the ornament 30 and the retainer 656. Thus, the ornament 30 is allowed to be rigidly secured to the upper wall 22 of the cover member 20. The provision of openings 658 in the retainer 656 serves for reducing the number of parts. This embodiment facilitates mounting of the retainer to the cover member, serving for improving an operating efficiency of manufacturing of the airbag module cover.

Figure 24:
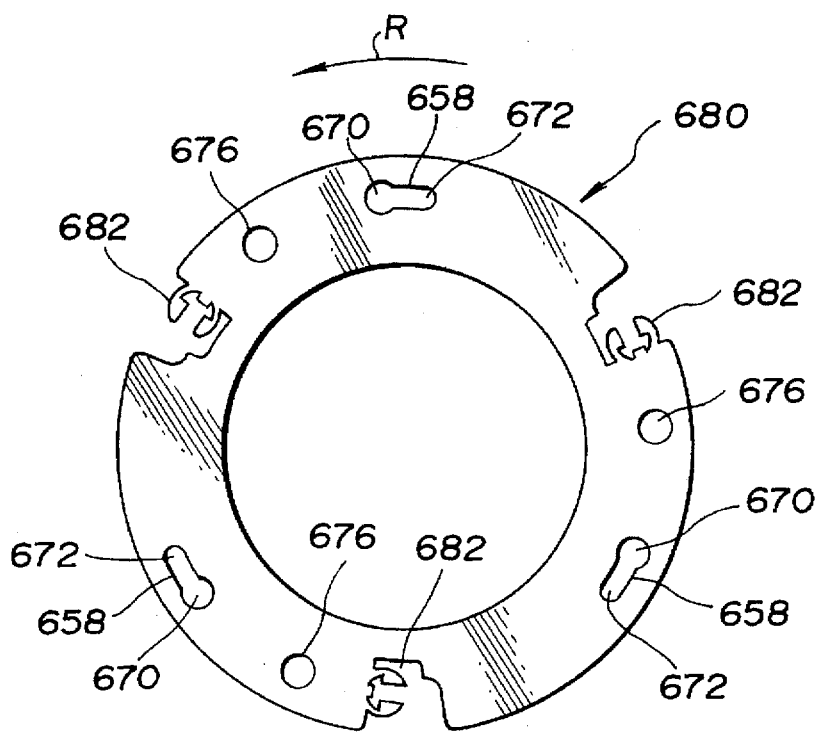
FIGS. 24–26 are enlarged plan views of modified retainers.
Figure 25:
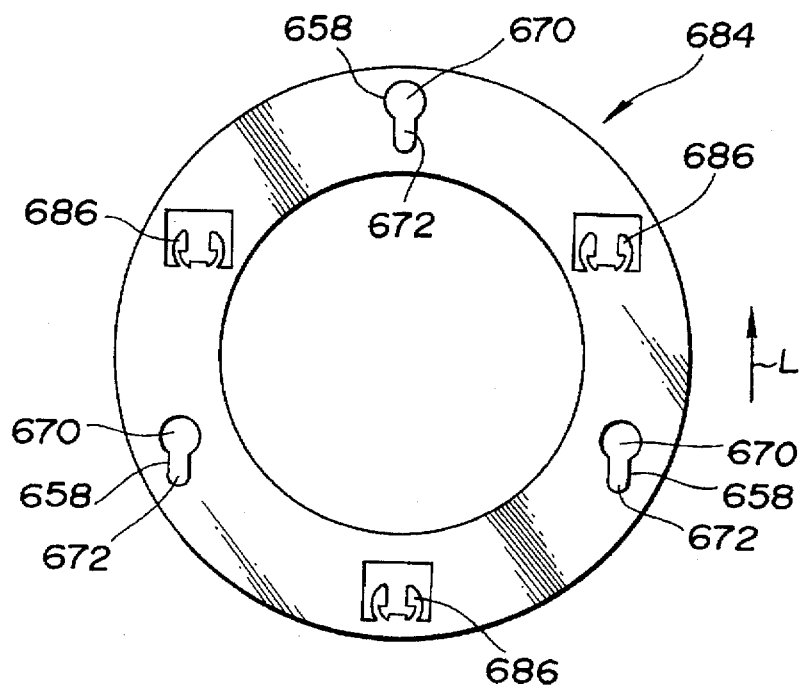
Figure 26:
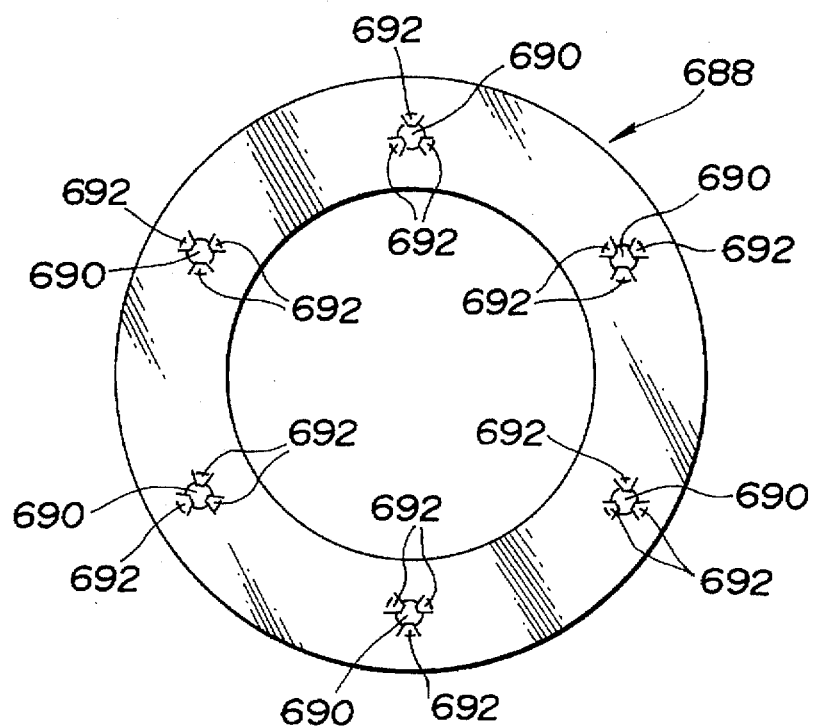

FIGS. 24–26 show modified retainers 680, 684, and 688 having detents and openings different in configuration and arrangement from those of the fifth embodiment, in which like reference numerals denote like parts. These retainers are of an annular plate made of spring steel.

As illustrated in FIG. 24, the modified retainer 680 has detents 682 disposed between the adjacent two openings 658. The detents 682 are in the form of an E-shaped retaining ring which is similar to the retaining ring 60 shown in FIG. 5 but formed integrally with a body of the retainer 680. The detents 682 are so arranged as to be engaged with the smaller-diameter portion 50A of the pin 36 and prevent the retainer 680 from rotating in the direction opposite to the direction R, when the retainer 680 is rotated in the direction R.

As illustrated in FIG. 25, the modified retainer 684 is provided with detents 886 which is in the form of an E-shaped retaining ring and formed integrally with a body of the retainer 684. The detents 686 are disposed between the adjacent two openings 658. The detents 686 and the guide grooves 672 of the openings 658 are so arranged as to be engaged with the smaller-diameter portion 50A of the pin 36 and prevent the retainer 684 from moving in a direction opposite to one direction as indicated at L, when the retainer 684 is moved in the direction L. Owing to this arrangement, the retainer 684 is formed with no tool insertion hole.

Figure 27:
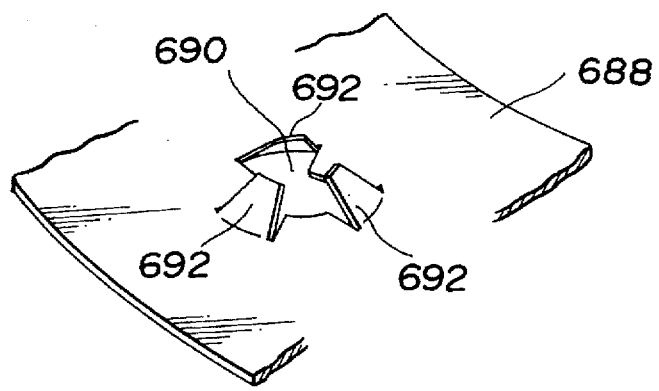
FIG. 27 is an enlarged fragmentary perspective view of FIG. 26.
Figure 28:
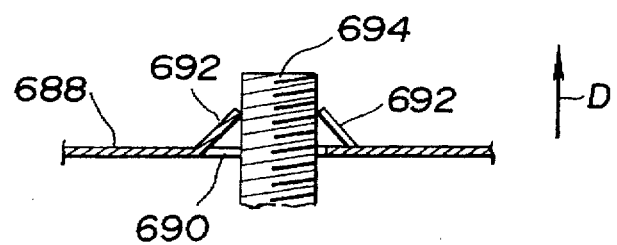
FIG. 28 is a fragmentary section of the retainer shown in FIG. 26, which is engaged with a screw.

As illustrated in FIG. 26, the modified retainer 688 has a plurality of openings 690 disposed corresponding to the pins connected to the ornament. The plurality of openings 690 are circumferentially arranged to be spaced apart from each other at a predetermined distance. A plurality of resiliently deformable pawls 692 extend radially inwardly from a peripheral edge each opening 690. The pawls 692 are inclined relative to a body of the retainer 688 as shown in FIG. 27, and project into the inside of the airbag module cover. The pawls 692 of the opening 690 engage the groove or flange of the pin to prevent the retainer 688 from moving relative to the pin in one direction. The pin is, for instance, the form of a screw 694 as partly shown in FIG. 28. Upon mounting the retainer 688 to the upper wall 22 of the cover member 20, the retainer 688 is moved in a direction D such that the opening 690 receives the screw 694. The pawls 692 engage threads of the screw 694 to prevent the retainer 688 from moving in a direction opposite to the direction D. The pawls 692 act as detent. Thus, the retainer 688 is held so as to compress the portion of the upper wall 22 of the cover member 20 between the ornament 30 and the retainer 688.

These modified retainers 680, 684, and 688 as shown in FIGS. 24–26 are dispensable with the retaining rings as explained in the first embodiment, serving for facilitating the mounting of the modified retainers relative to the cover member 20. This results in improving an operating efficiency of the manufacturing of the airbag module cover.

Figure 29:
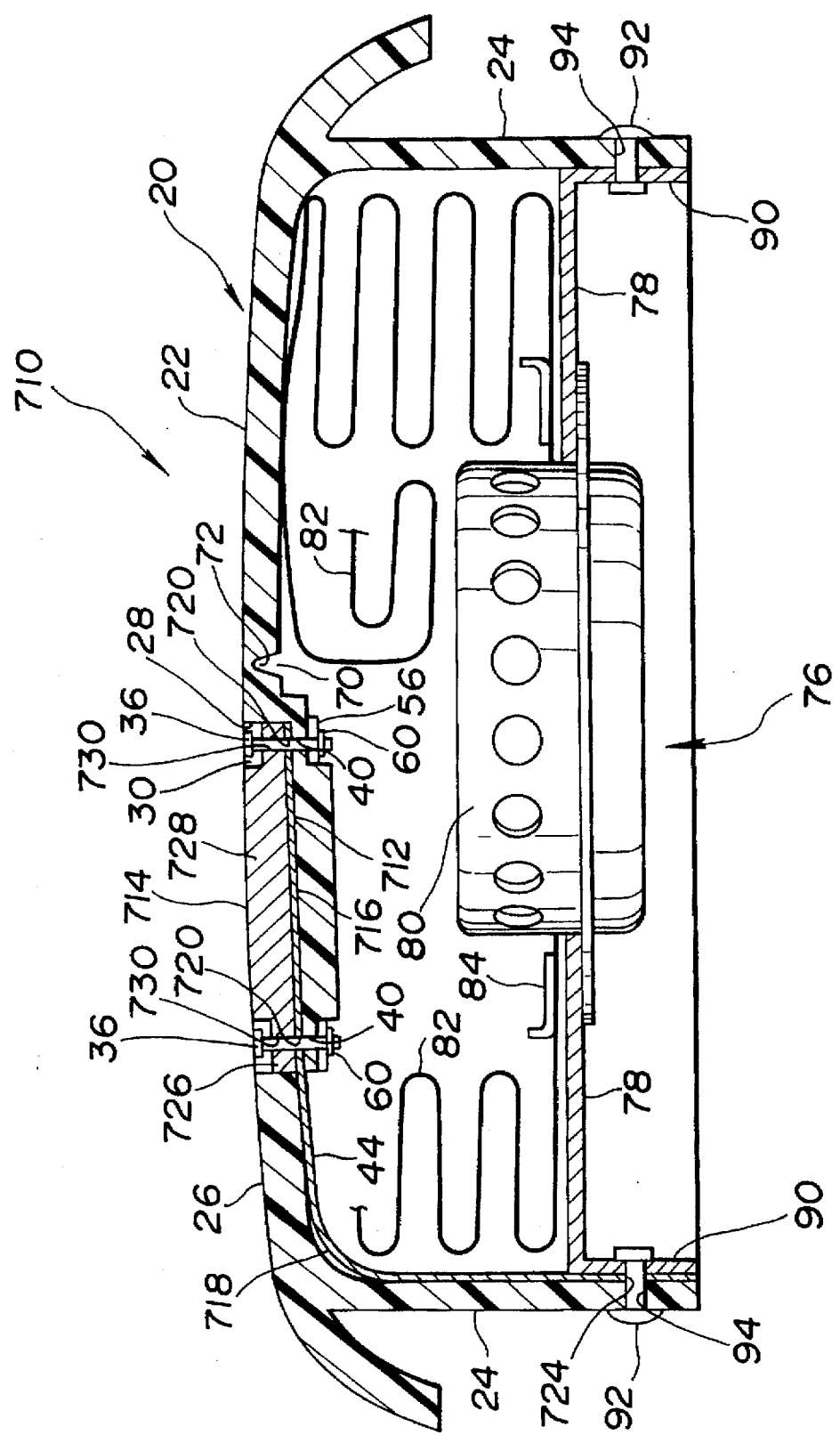
FIG. 29 is a section of a sixth embodiment of the airbag module cover secured to an airbag module, showing a cover member, a connecting film, and a center pad.
Figure 30:
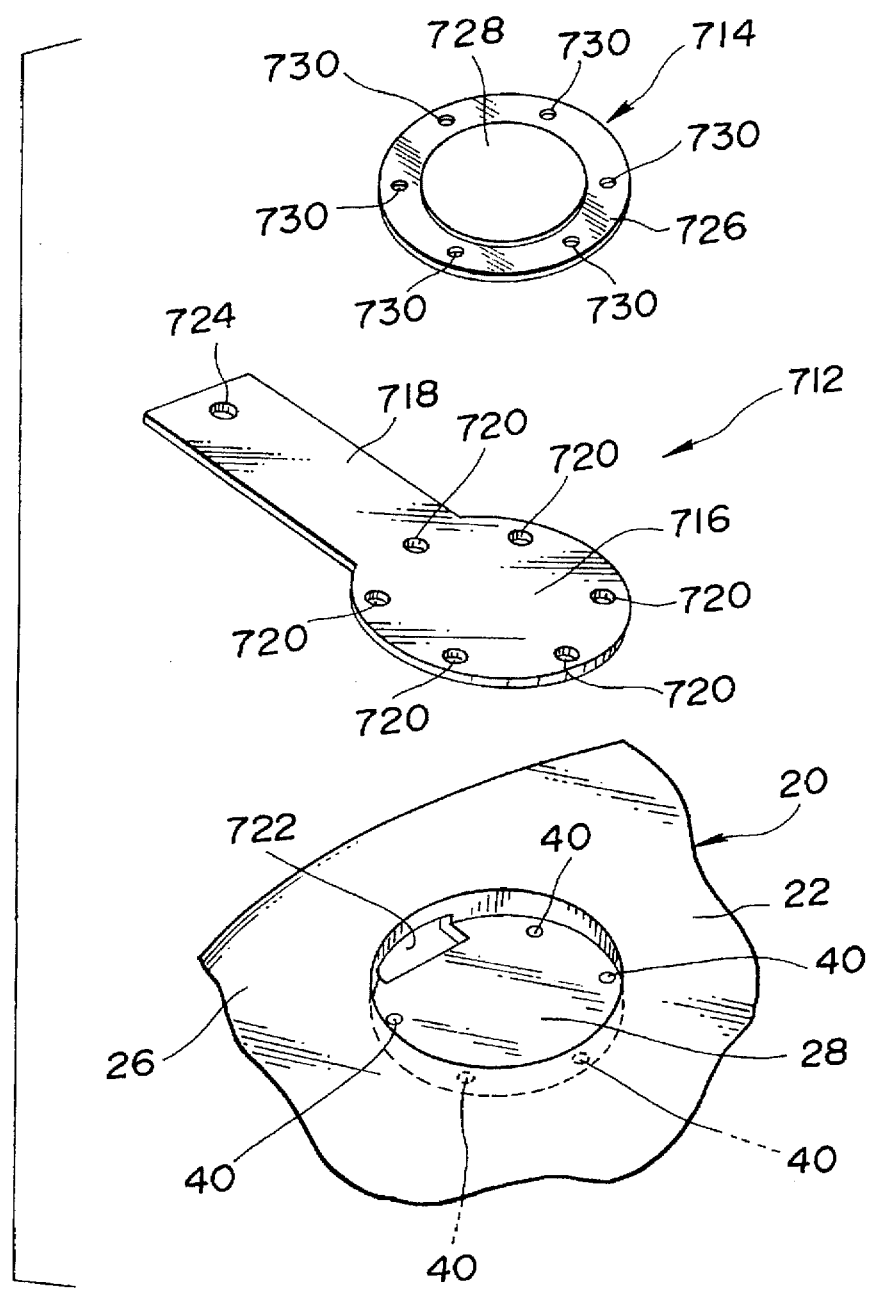
FIG. 30 is an exploded perspective view of the airbag module cover showing the connecting film and a part of the cover member.

Referring to FIGS. 29 and 30, an airbag module cover 710 of a sixth embodiment of the invention now will be explained. The airbag module cover 710 of the sixth embodiment is similar to the first embodiment except a connecting film 712 and a center pad 714 which are disposed between the cover member 20 and the ornament 30. Like reference numerals denote like parts and therefore detailed explanations therefor are omitted.

As illustrated in FIG. 29, the connecting film 712 is disposed on the outer recessed portion 28 of the upper wall 22 of the cover member 20. The connecting film 712 is made of an elastic resin material such as polyester resin. The connecting film 712 may be made of elastomer such as nylon, polycarbonate, polyurethane, paper impregnated with resin such as polypropylene, and nylon fabric or nonwoven nylon fabric, and be formed of various configurations corresponding to the configurations of various types of the ornament. The connecting film 712 includes a generally circular body portion 716 and a tongue portion 718 extending from the body portion 716, as best shown in FIG. 30. The circular body portion 716 is fit to the outer recessed portion 28 of the upper wall 22 and formed with a plurality of holes 720 aligned with the mount holes 40 of the outer recessed portion 28 and the holes 38 of the ornament 30. The tongue portion 718 passes through a cutout 722 formed in the outer recessed portion 28 as shown in FIG. 30, extending along the inner surface 44 of the upper wall 22 and the side wall 24 to be connected to a part of the side wall 24 by means of the rivets 92. Reference numeral 724 denotes a hole 724 formed in the tongue portion 718. Specifically, the part of the side wall 24 is connected to one of the flap portions of the upper wall 22 which is forcibly separated along the easy-to-break line 70 when the folded inflatable cushion 28 deploys. The tongue portion 718 is interposed between the side wall 24 of the cover member 20 and the flange portion 90 of the base plate 78 of the airbag module 76. Thus, the connecting film 712 is secured to the base plate 78 of the airbag module 76 together with the side wall 24 of the cover member 20.

The center pad 714 is made of a resilient material and of a disk-like shape including an annular flange portion 726 and a central projecting portion 728 connected with the flange portion 726 and extending upwardly as viewed in FIG. 29. The flange portion 726 is disposed on the circular body portion 716 of the connecting film 712 and fit to the outer recessed portion 28 of the upper wall 22 of the over member 20. The flange portion 726 is formed with a plurality of holes 730 aligned with the holes 720 of the body portion 716 of the connecting film 712. The center pad 714 is configured such that the central projecting portion 728 is substantially flush with the ornament 30 disposed on the flange portion 726.

The pin 36 connected with the ornament 30 extends through the aligned holes 730, 720, and 40 respectively formed in the flange portion 726 of the center pad 714, the body portion 716 of the connecting film 712, and the recessed portion 28 of the upper wall 22 of the cover member 20. The pin 36 is engaged at the distal ends thereof with the retaining rings 60, similar to the first embodiment. The flange portion 726 of the center pad 714, the body portion 716 of the connecting film 712, and the portion of the upper wall 22 of the cover member 20 are interposed between the ornament 30 and the retainer 56. The retainer 56 is held in such a manner as to compress the flange portion 726 of the center pad 714 and the recessed portion 28 of the upper wall 22 of the cover member 20 between the ornament 30 and the retainer 56. The flange portion 726 of the center pad 714 is restorative against the compression force because of resiliency of the center pad 714. Thus, the ornament 30 is prevented from being displaced relative to the recessed portion 28 of the upper wall 22 of the cover member 20.

In this embodiment, the ornament 30 is fixed to the upper wall 22 and connected to the side wall through the connecting film 712, whereby the ornament 30 is more rigidly secured to the cover member 20. This serves for preventing the removal of the ornament 30 from the cover member 20 during deployment of the folded inflatable cushion 82.

Figure 31:
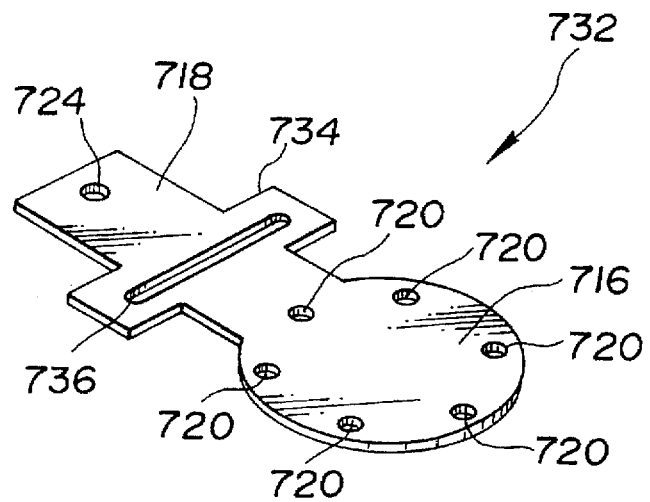
FIG. 31 is a perspective view of a modified connecting film.

FIG. 31 shows a modified connecting film 732 formed with a reinforcing portion 734. The reinforcing portion 734 is disposed at a mid-portion in a longitudinal direction of the tongue portion 718 and has a slot-like opening 736 perpendicular to the longitudinal direction of the tongue portion 718. The reinforcing portion 734 is expandable along the longitudinal direction. This provision of the reinforcing portion 734 serves for preventing a stress caused during deployment of the folded inflatable cushion 28, from being applied to the body portion 716 and the tongue port,on 718 of the connecting film 712 which are respectively connected to the upper wall 22 and the side wall 24. The provision of the reinforcing portion 734 also serves for assisting an easy turn of the flap portion of the upper wall 22 and thus a smooth deployment of the cushion 28.

Figure 32:
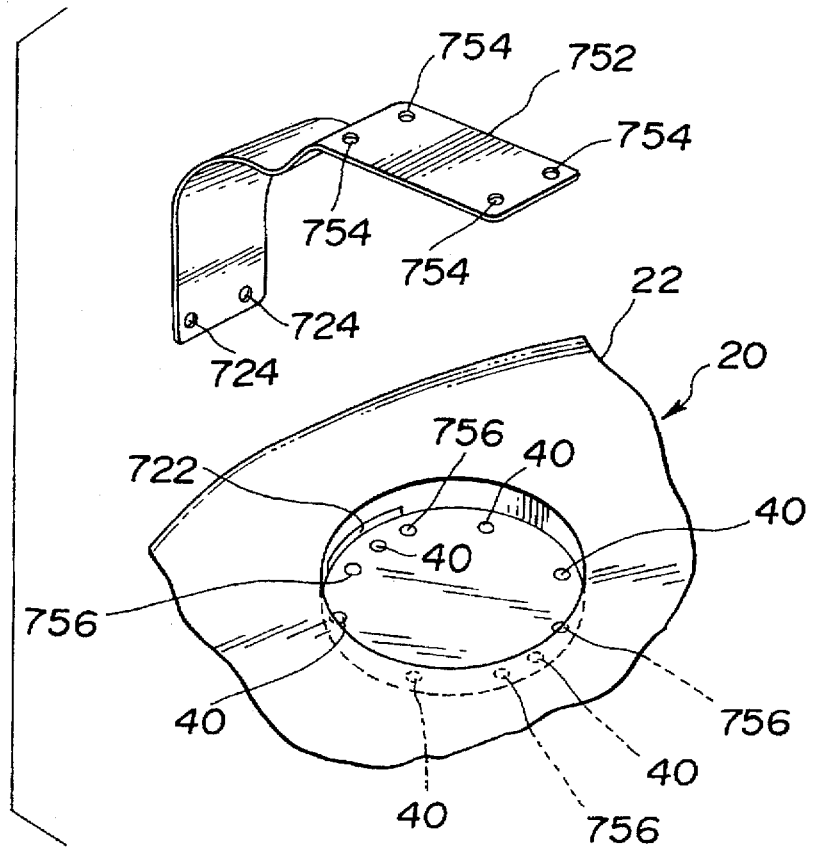
FIG. 32 is a view similar to FIG. 30 but showing a further modified connecting film.

FIG. 32 shows a further modified connecting film 752. As illustrated in FIG. 32, the connecting film 752 is in the form of a tape having a predetermined width extending perpendicular to a longitudinal direction thereof. The connecting film 752 has holes 754 for receiving fastening pins or rivets (not shown) which are used to secure the connecting film 752 to the ornament 30. The upper wall 22 of the cover member 20 has holes 756 corresponding to the holes 754 of the connecting Film 752 The connecting film 752 or the cover member 20 may be respectively provided with holes for receiving fastening members used for securing the connecting film 752 to the cover member 20.

Figure 33:
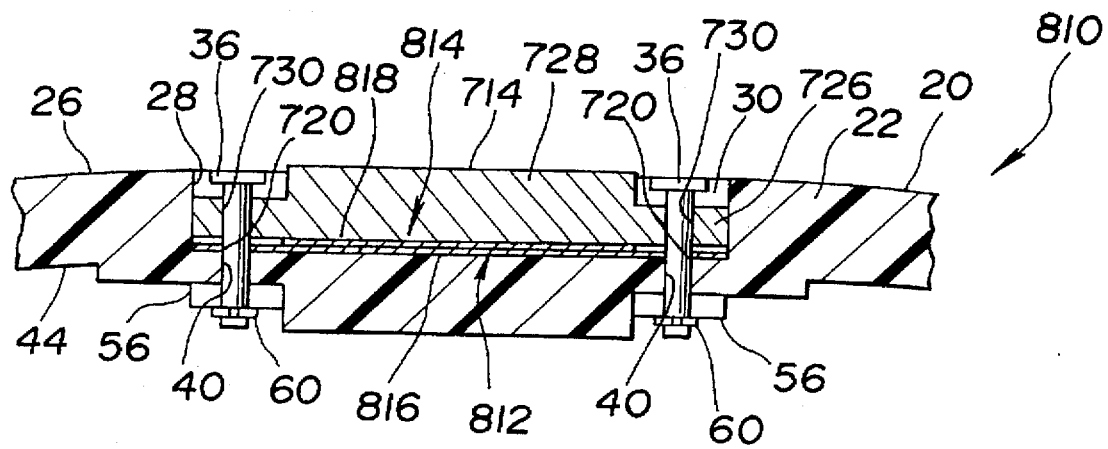
FIG. 33 is a fragmentary section of a seventh embodiment of the airbag module cover, showing a connecting film with a membrane type switch.
Figure 34:
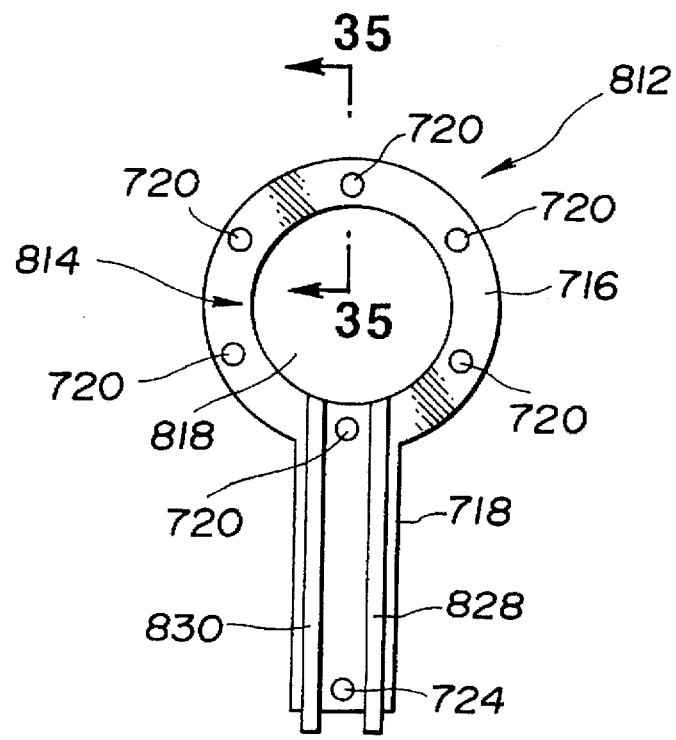
FIG. 34 is a plan view of the connecting film with the membrane type switch of FIG. 33.
Figure 35:
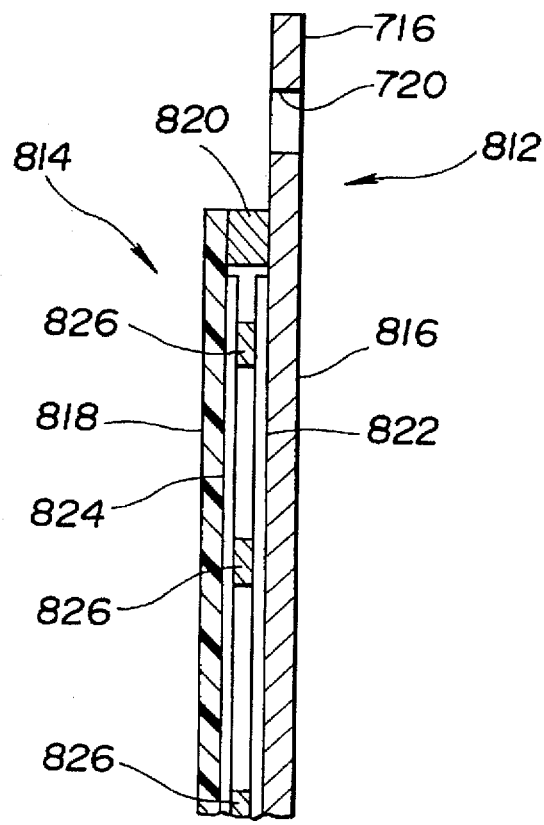
FIG. 35 is a section taken along line 35—35 of FIG. 34.

Referring to FIGS. 33–35, an airbag module cover 810 of a seventh embodiment according to the invention is now explained. The airbag module cover 810 is similar to the airbag module cover 710 of the sixth embodiment except a connecting film 812 having a membrane type switch 814. Like reference numerals denotes like parts and therefore detailed explanations therefor are omitted.

As best shown in FIG. 34, the connecting film 812 has the circular body portion 716 and the tongue portion 718 connected with the body portion 716, as well as the airbag module cover 710 of the six embodiment. The membrane type switch 814 is disposed on the body portion 716 so as to be surrounded by the holes 720. As illustrated in FIG. 35, the membrane type switch 814 is composed of a base layer 816 as a part of the body portion 716, a cover layer 818, and a joint member 820 which is interposed between the base layer 816 and the cover layer 818 to connect the two layers 816 and 818. Copper foils 822 and 824 acting as electrical conductive layers are disposed on opposing surfaces of the base layer 816 and the cover layer 818, respectively. Spacers 826 are interposed between the copper foils 822 and 824 and spaced apart from each other at a predetermined distance. The spacers 826 are of a pellet shape and made of an elastic insulating material such as silicone rubber. Leads 828 and 830 shown in FIG. 34, are electrically connected to the copper foils 822 and 824, respectively, and disposed on the tongue portion 718. The leads 828 and 830 are connected to external electrical circuitry utilized to actuate a horn (not shown). When pressure is applied to the center pad 714 shown in FIG. 33, the cover layer 818 of the membrane type switch 814 is urged to move toward tile base layer 816 thereof. This causes a contact between the copper foils 822 and 824 whereby the circuit is closed or completed to actuate the horn. The membrane type switch 814 on the connecting film 812 is applicable to various apparatus such as air-conditioner, audio system, ASCD (automatic speed control device).

Figure 36:
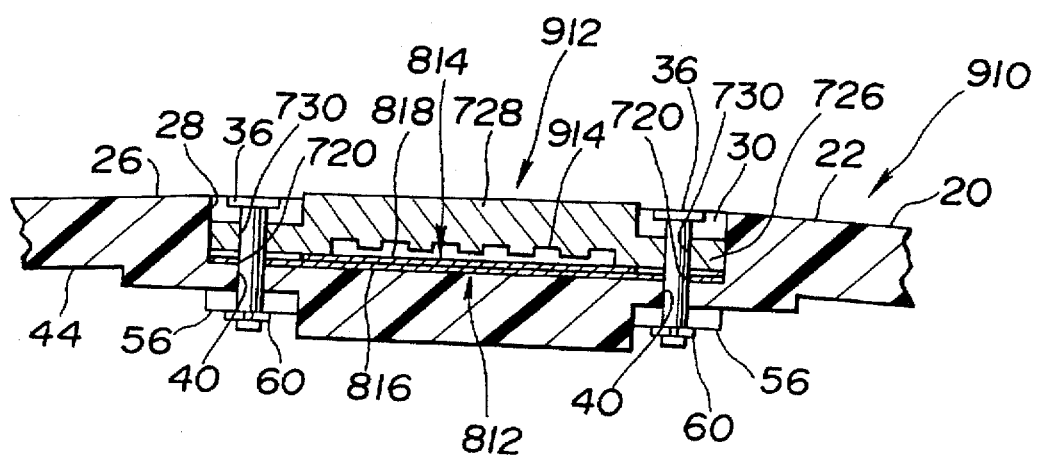
FIG. 36 is a fragmentary section of an eighth embodiment of the airbag module cover.

Referring to FIG. 36, there is shown an airbag module cover 910 of an eighth embodiment according to the invention, which is similar to the airbag module cover 810 of the seventh embodiment except a center pad 912 having a grooved inner surface 914. Like reference numerals denotes like parts and therefore detailed explanations therefor are omitted.

The center pad 912 differs from the center pad 714 of the sixth embodiment in provision of the grooved inner surface 914 which is opposed to the membrane type switch 814 of the connecting film 812 as illustrated in FIG. 36. The grooved inner surface 914 is spaced apart from the membrane type switch 814 at a predetermined distance. The provision of the grooved inner surface 914 serves for improving a performance of the membrane type switch 814.

In the aforementioned sixth, seventh and eighth embodiments, the pins 36 may be formed integrally with the ornament 30.

The airbag module cover of the invention are not limited to the aforementioned embodiments provided for the driver's side airbag module, and are applicable to an assistant driver's side airbag module installed to an instrument panel, a rear passenger's side airbag module installed to a seat back of a front passenger's seat, or an airbag module installed to a door or a seat side.

What is claimed is:

1. An airbag module cover, comprising:

a cover member;

an ornament on said cover member;

a fastener connected to and extending from said ornament to pass through said cover member; and a retainer in engagement with said fastener and cooperating with said ornament to interpose therebetween a portion of said cover member.

2. The airbag module cover as claimed in claim 1, further comprising means for preventing said retainer from being disengaged from said fastener.

3. The airbag module cover as claimed in claim 2, wherein said preventing means includes a groove disposed on said fastener, and a retaining ring engaged with said groove.

4. The airbag module cover as claimed in claim 3, wherein said retainer is held in such a manner as to compress said portion of said cover member between said ornament and said retainer.

5. The airbag module cover as claimed in claim 4, wherein said portion of said cover member is made of a resilient resin material.

6. The airbag module cover as claimed in claim 2, wherein said preventing means includes a flange disposed on said fastener.

7. The airbag module cover as claimed in claim 6, wherein said retainer is held in such a manner as to compress said portion of said cover member between said ornament and said retainer.

8. The airbag module cover as claimed in claim 7, wherein said portion of said cover member is made of a resilient resin material.

9. The airbag module cover as claimed in claim 1, wherein said retainer is in the form of a plate and in face-to-face contact with said portion of said cover member.

10. The airbag module cover as claimed in claim 1, wherein said fastener has a distal end projecting from said retainer, said cover member being so disposed as to be substantially flush with said distal end of said fastener or retracted therefrom.

11. The airbag module cover as claimed in claim 2, wherein said preventing means includes a greater-diameter portion and a smaller-diameter portion which are formed on said fastener, and an opening disposed in said retainer to be engaged with said greater-diameter portion and said smaller-diameter portion.

12. The airbag module cover as claimed in claim 11, wherein said opening includes a hole and a guide groove connected to said hole, said hole being so configured as to allow insertion of said greater-diameter portion and said smaller-diameter portion, said guide groove being so configured as to allow insertion of said smaller-diameter portion but prevent insertion of said greater-diameter portion.

13. The airbag module cover as claimed in claim 12, wherein said retainer is held in such a manner as to compress said portion of said cover member between said ornament and said retainer.

14. The airbag module cover as claimed in claim 13, wherein said portion of said cover member is made of a resilient resin material.

15. The airbag module cover as claimed in claim 2, wherein said fastener is formed integrally with said ornament.

16. The airbag module cover as claimed in claim 15, wherein said preventing means includes a groove disposed on said fastener, and a retaining ring engaged with said groove.

17. The airbag module cover as claimed in claim 16, wherein said retainer is held in such a manner as to compress said portion of said cover member between said ornament and said retainer.

18. The airbag module cover as claimed in claim 17, wherein said portion of said cover member is made of a resilient resin material.

19. The airbag module cover as claimed in claim 15, wherein said preventing means includes a flange disposed on said fastener.

20. The airbag module cover as claimed in claim 19, wherein said retainer is held in such a manner as to compress said portion of said cover member between said ornament and said retainer.

21. The airbag module cover as claimed in claim 20, wherein said portion of said cover member is made of a resilient resin material.

22. The airbag module cover as claimed in claim 2, wherein said cover member includes a mounting structure, said mounting structure including a wall which extends from said cover member and is spaced apart from said ornament.

23. The airbag module cover as claimed in claim 22, further comprising connecting means for connecting said ornament to said wall.

24. The airbag module cover as claimed in claim 23, wherein said connecting means is interposed between said cover member and said ornament, said connecting means having a tongue portion passing through a cutout formed in said portion of said cover member, said connecting means being connected at said tongue portion to said wall.

25. The airbag module cover as claimed in claim 24, wherein said connecting means has a membrane type switch opposed to said ornament.

26. The airbag module cover as claimed in claim 24, wherein said preventing means includes a groove disposed on said fastener, and a retaining ring engaged with said groove.

27. The airbag module cover as claimed in claim 26, wherein said retainer is held in such a manner as to compress said portion of said cover member between said ornament and said retainer.

28. The airbag module cover as claimed in claim 27, wherein said portion of said cover member is made of a resilient resin material.

29. The airbag module cover as claimed in claim 24, wherein said preventing means includes a flange disposed on said fastener.

30. The airbag module cover as claimed in claim 29, wherein said retainer is held in such a manner as to compress said portion of said cover member between said ornament and said retainer.

31. The airbag module cover as claimed in claim 30, wherein said portion of said cover member is made of a resilient resin material.

32. The airbag module cover as claimed in claim 24, wherein said fastener is formed integrally with said ornament.

33. The airbag module cover as claimed in claim 32, wherein said preventing means includes a groove disposed on said fastener, and a retaining ring engaged with said groove.

34. The airbag module cover as claimed in claim 33, wherein said retainer is held in such a manner as to compress said portion of said cover member between said ornament and said retainer.

35. The airbag module cover as claimed in claim 34, wherein said portion of said cover member is made of a resilient resin material.

36. The airbag module cover as claimed in claim 32, wherein said preventing means includes a flange disposed on said fastener, said flange being engaged with said retainer.

37. The airbag module cover as claimed in claim 36, wherein said retainer is held in such a manner as to compress said portion of said cover member between said ornament and said retainer.

38. The airbag module cover as claimed in claim 37, wherein said portion of said cover member is made of a resilient resin material.

39. The airbag module cover as claimed in claim 9, wherein said ornament is of an annular shape.

40. The airbag module cover as claimed in claim 39, wherein said fastener is in the form of a plurality of pins which are circumferentially disposed on said ornament and spaced apart from each other at a predetermined distance.

41. The airbag module cover as claimed in claim 40, wherein said preventing means includes a greater-diameter portion and a smaller-diameter portion which are formed on each of said plurality of pins, and an opening disposed in said retainer to be engaged with said greater-diameter portion and said smaller-diameter portion.

42. The airbag module cover as claimed in claim 41, wherein said opening includes a hole and a guide groove connected to said hole, said hole being so configured as to allow insertion of said greater-diameter portion and said smaller-diameter portion, said guide groove being so configured as to allow insertion of said smaller-diameter portion but prevent insertion of said greater-diameter portion.

43. The airbag module cover as claimed in claim 42, wherein said retainer is moved relative to said plurality of pins upon mounting, whereby said ornament is secured to said cover member by said plurality of pins and said retainer.

44. The airbag module cover as claimed in claim 40, wherein said plurality of pins are in the form of a screw.

45. The airbag module cover as claimed in claim 42, wherein said retainer is held in such a manner as to compress said portion of said cover member between said ornament and said retainer.

46. The airbag module cover as claimed in claim 45, wherein said portion of said cover member is made of a resilient resin material.

47. An airbag module cover, comprising:
a cover member;
an ornament on said cover member;
a fastener connected to and extending from said ornament to pass through said cover member;
a retainer in engagement with said fastener and cooperating with said ornament to interpose therebetween a portion of said cover member; and
means for holding said retainer in such a manner as to compress said portion between said ornament and said retainer.

* * * * *